United States Patent
Poothiyot et al.

(10) Patent No.: US 11,544,604 B2
(45) Date of Patent: Jan. 3, 2023

(54) ADAPTIVE MODEL INSIGHTS VISUALIZATION ENGINE FOR COMPLEX MACHINE LEARNING MODELS

(71) Applicant: Adobe Inc., San Jose, CA (US)

(72) Inventors: Ashok Pancily Poothiyot, San Jose, CA (US); Vidit Bhatia, San Jose, CA (US); Matthew Colon, San Jose, CA (US)

(73) Assignee: Adobe Inc., San Jose, CA (US)

( * ) Notice: Subject to any disclaimer, the term of this patent is extended or adjusted under 35 U.S.C. 154(b) by 334 days.

(21) Appl. No.: 16/597,336

(22) Filed: Oct. 9, 2019

(65) Prior Publication Data

US 2021/0110288 A1    Apr. 15, 2021

(51) Int. Cl.
*G06N 5/04* (2006.01)
*G06N 20/00* (2019.01)
*G06F 8/20* (2018.01)
*G06F 8/30* (2018.01)
*G06F 8/34* (2018.01)

(52) U.S. Cl.
CPC .............. *G06N 5/045* (2013.01); *G06F 8/20* (2013.01); *G06N 20/00* (2019.01); *G06F 8/30* (2013.01); *G06F 8/34* (2013.01)

(58) Field of Classification Search
CPC ........... G06N 5/045; G06N 20/00; G06F 8/30
USPC .................................. 717/120–160, 104–113
See application file for complete search history.

(56) References Cited

U.S. PATENT DOCUMENTS

| | | | |
|---|---|---|---|
| 8,380,642 B2* | 2/2013 | Stundner | G06N 5/04 706/12 |
| 10,719,301 B1* | 7/2020 | Dasgupta | G06K 9/6267 |
| 10,810,491 B1* | 10/2020 | Xia | G06N 3/08 |
| 10,861,590 B2* | 12/2020 | White | G06F 40/295 |
| 11,159,771 B2* | 10/2021 | Schmirler | H04N 7/181 |
| 2015/0379429 A1* | 12/2015 | Lee | G06N 20/00 706/11 |
| 2020/0012937 A1* | 1/2020 | Walters | G06F 9/547 |

(Continued)

OTHER PUBLICATIONS

Chatzimparmpas, Angelos, et al. "A survey of surveys on the use of visualization for interpreting machine learning models." Information Visualization 19.3 (2020): pp. 207-233. (Year: 2020).*

(Continued)

*Primary Examiner* — Satish Rampuria
(74) *Attorney, Agent, or Firm* — Keller Preece PLLC

(57) ABSTRACT

The present disclosure relates to systems, methods, and non-transitory computer-readable media for utilizing a parameterized notebook to adaptively generate visualizations regarding machine-learning models. In particular, the disclosed systems can generate a parameterized notebook based on a user-defined visualization recipe and provide parameter values that correspond to the machine-learning model to the parameterized notebook. Upon execution of the user-defined visualization recipe via the parameterized notebook, the disclosed systems can extract visualization data corresponding to the machine-learning model from the parameterized notebook. In addition, the disclosed systems can generate visualizations based on the visualization data and provide the generated visualizations for display in a graphical user interface.

20 Claims, 15 Drawing Sheets

(56) References Cited

U.S. PATENT DOCUMENTS

2020/0285997 A1* 9/2020 Bhattacharyya ....... G06N 20/00

OTHER PUBLICATIONS

Sacha, Dominik, et al. "Human-centered machine learning through interactive visualization." ESANN, 2016.pp. 641-646 (Year: 2016).*

Murdoch, W. James, et al. "Interpretable machine learning: definitions, methods, and applications." arXiv preprint arXiv:1901.04592 (2019).pp. 1-11 (Year: 2019).*

Jordan, Michael I., et al. "An introduction to variational methods for graphical models." Machine learning 37.2 (1999): pp. 183-233. (Year: 1999).*

Mooij, Joris M. "libDAI: A free and open source C++ library for discrete approximate inference in graphical models." The Journal of Machine Learning Research 11 (2010): pp. 2169-2173. (Year: 2010).*

Vellido, Alfredo, José David Martín-Guerrero, and Paulo JG Lisboa. "Making machine learning models interpretable." ESANN. vol. 12. 2012.pp. 163-172. (Year: 2012).*

"ModelDB: A system to manage machine learning models"; Date downloaded Oct. 15, 2019; https://mitdbg.github.io/modeldb/.

"Trifacta: Empowering everyone to be a Data Wrangler"; Date downloaded Oct. 15, 2019; https://www.trifacta.com/products/.

"JupyterLab extension visualize data with Voyager"; Date downloaded Oct. 15, 2019; https://github.com/altair-viz/jupyterlab_voyager.

"What is Power BI?" Date downloaded Oct. 15, 2019; https://powerbi.microsoft.com/en-us/what-is-power-bi/.

"Push Intelligence: Give your data the audience it deserves"; Date downloaded Oct. 15, 2019; https://www.metricinsights.com.

Armand Ruiz; InfoWorld from IDG; "The 80/20 data science dilemma"; Sep. 26, 2017; https://www.infoworld.com/article/3228245/the-80-20-data-science-dilemma.html.

Gil Press; Forbes; "Cleaning Big Data: Most Time-Consuming, Least Enjoyable Data Science Task, Survey Says"; Mar. 23, 2016; https://www.forbes.com/sites/gilpress/2016/03/23/data-preparation-most-time-consuming-least-enjoyable-data-science-task-survey-says/#3c780ca76f63.

"Machine learning for every developer and data scientist"; Date downloaded Oct. 15, 2019 https://aws.amazon.com/sagemaker/.

"Azure Machine Learning—Enterprise-grade machine learning service to build and deploy models faster"; Date downloaded Oct. 15, 2019; https://azure.microsoft.com/en-us/services/machine-learning/.

Adobe Experience Platform; Date downloaded Oct. 15, 2019; https://www.adobe.com/experience-platform/data-science-workspace.html.

Nikaash Puri et al.; "MAGIX: Model Agnostic Globally Interpretable Explanations"; Cornell University; arXiv:1706.07160v3 [cs.AI] Jun. 15, 2018; https://arxiv.org/pdf/1706.07160.pdf.

Adobe Sensei Studio; Date downloaded Oct. 15, 2019 https://www.adobe.com/sensei.html.

Deepcompare: Visual and Interactive Comparison of Deep Learning Model Performance by Murugesan et al. and published in IEEE Computer Graphics and Applications (vol. 39, Issue 5, published May 27, 2019).

* cited by examiner

ADAPTIVE MODEL INSIGHTS VISUALIZATION ENGINE FOR COMPLEX MACHINE LEARNING MODELS

BACKGROUND

Recent years have seen significant improvements in computer systems for implementing artificial intelligence and machine learning models. For example, computer systems can implement machine learning models (such as neural networking models) to identify objects portrayed in digital images, identify and provide targeted digital content to client devices across computing networks, generate digital animations that illustrate realistic movement patterns, or operate autonomous vehicles. Such advancements have occurred as a result of many factors in relation to training data sourcing and generation, feature engineering, model engineering (e.g., modification of machine-learning architecture and parameters), model training, and improved model operation.

In generating, training, and operating machine learning models, some conventional systems provide limited model evaluation tools. For instance, some conventional systems provide a standardized set of visualizations to assist engineers in analyzing and explaining operation of machine learning models. Although conventional systems provide some tools for evaluating operation of machine learning models, these tools suffer from a number of technical shortcomings, particularly with regards to flexibility, efficiency, and accuracy of operation.

For example, conventional systems are often rigid and inflexible. Indeed, as mentioned above, conventional systems typically provide a pre-defined set of static, standardized visualizations that are provided for analyzing machine learning models. Unfortunately, machine learning models are not uniform or static and projects and engineers vary widely within the machine learning community. Computer engineers have generated a variety of different algorithms in different classes, that utilize different operations or loss functions, that manage optimization in different approaches, and that aim to track different results or metrics. Moreover, models often continually learn, adapt to data drifts, and evolve over time. In addition, engineers often utilize different coding languages that are not compatible with pre-defined visualization requirements (or implementing APIs and software development kits). Accordingly, the rigid approach utilized by conventional systems in generating pre-defined analytics visualizations fails to flexibly accommodate the demands and variability of modern machine learning model engineering.

In addition to flexibility, conventional systems also have significant shortcomings with regard to efficiency. Conventional systems often require significant time, computer resources, and user interaction to analyze machine learning models. To illustrate, in implementing conventional systems, data engineers are often required to provide a number of user interactions across different system components to identify, track, and compile machine learning model parameters; generate analytical visualizations; and then update and/or modify visualizations over time. These processes and procedures require excessive user interactions and an exceedingly large number of user interfaces that require significant computing resources and time to operate. These inefficiencies are significant, inasmuch as data scientists typically configure tens to hundreds of model experiments before arriving at a model that satisfies acceptance criteria. Furthermore, machine learning models typically require analysis of large data volumes and conventional systems perform slowly and require extensive time and computer resources to generate analytics visualizations.

Furthermore, conventional systems have additional shortcomings with regard to accuracy. For example, as just discussed, conventional systems often provided decreased accessibility to performance analytics and metrics for machine learning models. For example, pre-defined analytics provided by conventional systems do not provide information needed by engineers (and the time and computer resources needed to provide alternative information is too expensive). Without such information, conventional systems often produce inaccurate machine learning models. Indeed, the problems with regard to accuracy and efficiency discussed above often lead to inaccurate, incomplete, or insufficient information as engineers train or operate machine learning models, ultimately undermining the accuracy and implementation of the models themselves.

BRIEF SUMMARY

Embodiments of the present disclosure provide benefits and/or solve one or more of the foregoing or other problems in the art with systems, non-transitory computer-readable media, and methods that utilize a parameterized notebook to adaptively and efficiently generate visualizations regarding a variety of machine-learning models. For example, the disclosed systems can generate a parameterized notebook with custom recipes particular to the machine learning models and demands of a particular project. The disclosed systems can execute a machine learning model (e.g., train or operate the machine learning model) and provide parameter values of the machine-learning model to the parameterized notebook. The parameterized notebook can apply the custom recipes to the parameter values of the machine-learning model to generate custom visualization data. In turn, the disclosed systems can automatically extract the visualization data and provide a corresponding visualization on a graphical user interface (e.g., on a web application) for evaluating the machine-learning model. In this manner, the disclosed systems can iteratively generate and provide dynamic, custom, targeted visualizations for accurate evaluation and analysis of machine-learning models across a variety of different machine learning models, programming languages, optimization schemes, loss functions, or target applications.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
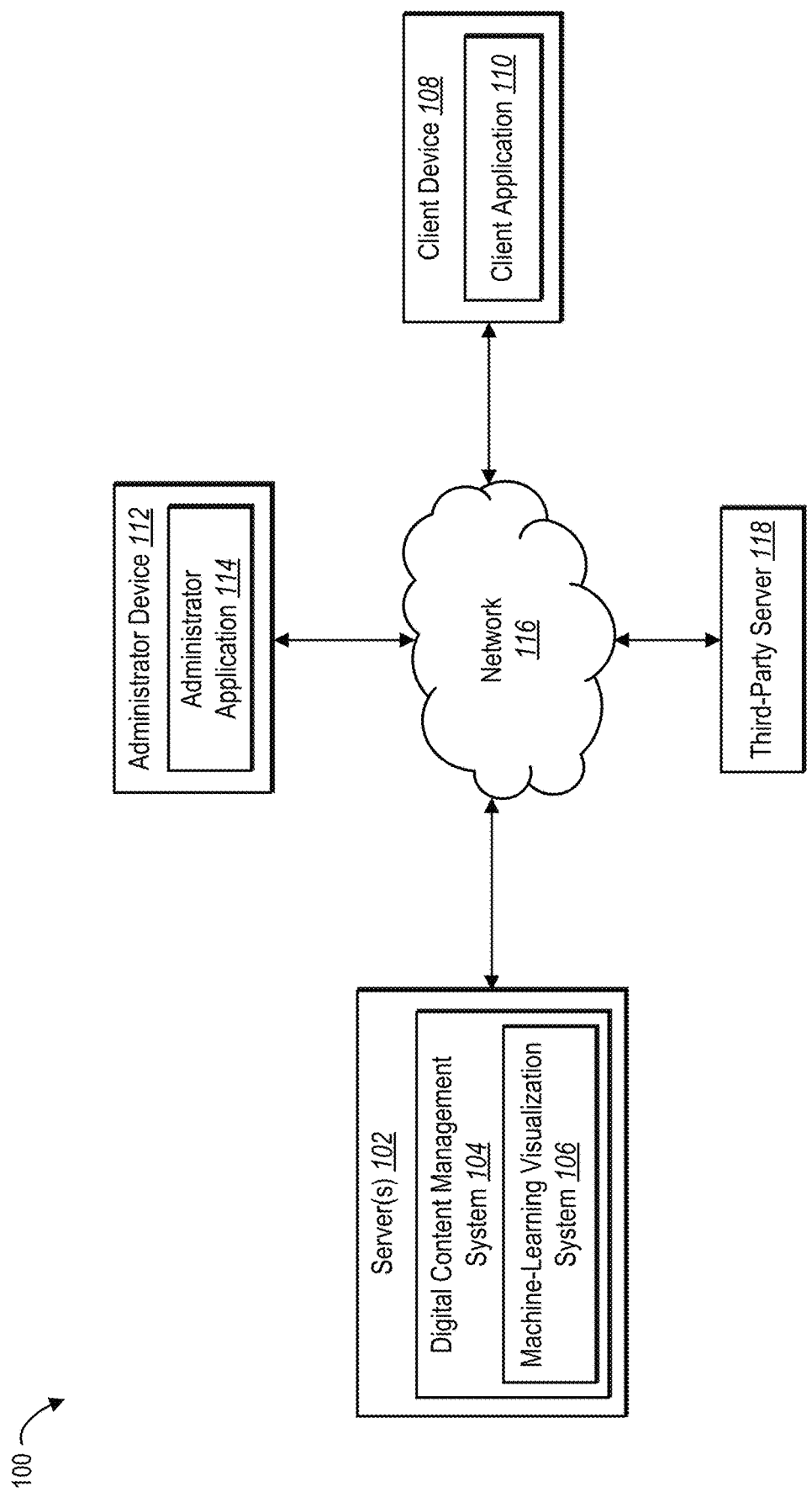
FIG. 1 illustrates a diagram of a system environment including a machine-learning visualization system in accordance with one or more embodiments.

This disclosure describes one or more embodiments of a machine-learning visualization system that utilizes a parameterized notebook to adaptively generate visualizations regarding machine-learning models. In particular, the machine-learning visualization system can utilize custom visualization recipes within parameterized notebooks to analyze machine learning model as they are trained or implemented. The machine-learning visualization system can scrape visualization data from the parameterized notebook and surface visualizations to client devices as insights into performance of a machine-learning model. In addition, the machine-learning visualization system can provide the visualizations to the user interface in a dynamic fashion (e.g., automatically in response to changes to the machine-learning model). The machine-learning visualization system can thus improve optimization of non-standard artificial intelligence/machine learning algorithms by utilizing a set of configurable tools to generate custom evaluation visualizations using headless parameterized notebooks as part of model evaluation/optimization.

To illustrate, in some embodiments, the machine-learning visualization system generates a parameterized notebook based on a user-defined visualization recipe. Further, the machine-learning visualization system can provide parameter values corresponding to a machine-learning model to the parameterized notebook for executing the user-defined visualization recipe. Upon execution of the user-defined visualization recipe via the parameterized notebook, the machine-learning visualization system can extract visualization data corresponding to the machine-learning model from the parameterized notebook and then generate a visualization based on the extracted visualization data. The machine-learning visualization system can, in turn, surface the generated visualization for display in a graphical user interface (e.g., of a client device).

As mentioned above, the machine-learning visualization system can generate a parameterized notebook based on a custom visualization recipe. In particular, the machine-learning visualization system can identify a user-defined visualization recipe that reflects the custom needs of a particular design project. The machine-learning visualization system can transmit the visualization recipe to a notebook for custom analysis of machine learning models. For example, a parameterized notebook can include a headless notebook (i.e., software running without a graphical user interface) that computes visualizations using parameters passed during an evaluation trigger. In some embodiments, the machine-learning visualization system is language agnostic, such that engineers can design machine learning models in a variety of languages that need not align to the particular language of the visualization recipe or the parameterized notebook.

The machine-learning visualization system can also execute and monitor performance of machine learning models. For example, the machine-learning visualization system can train or implement a machine learning model. In executing machine learning models, the machine-learning visualization system can identify parameter values corresponding to execution of the machine-learning model. For example, the machine-learning visualization system can monitor performance metrics, iterations, modifications, time, weight modifications, or other parameter values corresponding to the machine-learning model.

As suggested above, the machine-learning visualization system can utilize the parameterized notebook to analyze the machine-learning model parameter values. Specifically, the machine-learning visualization system can extract and provide relevant parameter values to the parameterized notebook and the parameterized notebook can apply the custom visualization recipe to the parameter values to generate visualization data. Because the custom visualization recipe reflects the visualization needs of a particular project, the parameterized notebook can generate non-standard visualization data unique to a particular engineer, project, or machine learning model.

Upon executing the parameterized notebook, the machine-learning visualization system can extract visualization data and generate visualizations. For instance, the machine-learning visualization system can scrape visualization data from the parametrized notebook and then render custom visualizations within a user interface (e.g., a web interface accessible by engineers, project managers, etc.). To illustrate, the machine-learning visualization can utilize a notebook JSON-to-png scraper and notebook javascript-to-HTML visualization converter to extract and render notebook visualizations natively within a model evaluation user interface.

By using a parameterized notebook, the machine-learning visualization system can iteratively provide custom visualizations for machine-learning models, including, complex or advanced machine-learning models. Indeed, the machine-learning visualization system can iteratively apply the parameterized notebook to a machine learning model in response to various triggers to generate dynamic visualizations that change over time based on the custom visualization recipe and the parameter values associated with the machine-learning model. Thus, the machine-learning visualization system can show, via visualizations presented to various user interfaces of clients devices, how a machine-learning model evolves over time.

The machine-learning visualization system can also generate suggestions to improve execution and analysis of machine-learning models. For example, in some embodiments, the machine-learning visualization system tracks user-defined visualization recipes, network architectures, modifications, parameters, and/or visualizations utilized with respect to machine-learning models as part of an interaction history. Based on this interaction history, the machine-learning visualization system can train a machine-learning model to generate suggestions (e.g., a suggested visualization, a suggested visualization recipe, a modification to the machine-learning model, etc.) and explanations.

Thus, the machine-learning visualization system can suggest how to improve model optimization and also maintain auditability of machine-learning optimization.

As suggested by the foregoing, the machine-learning visualization system can provide several technical advantages relative to conventional systems. For example, the machine-learning visualization system can increase flexibility of machine-learning model evaluation. In particular, in contrast to conventional systems, the machine-learning visualization system can utilize parameterized notebooks to generate custom visualizations with respect to non-standard machine learning models from different algorithm classes, with different operations and loss functions, with different optimization approaches, and that aim to track different results and metrics. Additionally, the machine-learning visualization system enables custom and non-standard visualizations by allowing a user to tailor the visualization recipe as desired. Moreover, the machine-learning visualization system can implement flexible model evaluation visualizations that adapt to machine learning models using notebook templates. Thus, the machine-learning visualization system can provide temporary parameterized notebooks to generate and render visualizations on the fly in response to evaluation triggers or for each new evaluation run of the machine learning model.

Moreover, the machine-learning visualization system can be implemented cross-platform, and is extensible and pluggable to different applications or implementations. For example, the machine-learning visualization system can utilize a modular architecture that includes client, server, and visualization components powered by parameterized notebooks that can be integrated with machine learning runtime tools, such as Python, R, Spark and TensorFlow. This architecture allows a wide variety of tools to be easily integrated to provide richer and more extensive insights evaluations. Moreover, the machine-learning visualization system can flexibly mix different runtime languages for the machine-learning model and the parameterized notebook. Furthermore, the machine-learning visualization system can utilize application programming interfaces according to a representational state transfer (REST) approach, thereby extending compatibility to other software technologies (in contrast to some conventional systems that utilize a thrift-based approach requiring a tightly coupled SDK to send metrics).

The machine-learning visualization system can also improve efficiency. Indeed, by generating dynamic visualizations utilizing a parameterized notebook, the machine-learning visualization system can significantly reduce the time, computer resources, and user interactions needed to analyze machine learning models. For example, utilizing a custom recipe in a parameterized notebook, the machine-learning visualization system can automatically generate and surface custom visualizations over time without additional user interactions or revisions. Moreover, because the machine-learning visualization system can leverage a variety of machine-learning environments (e.g., Jupyter based notebook environments), it is intuitive, easy, efficient, and fast for data scientists to implement at corresponding client devices. Furthermore, by utilizing a parameterized notebook decoupled from client devices, the machine-learning visualization system can decrease computational overhead for a client device while still surfacing visualizations that are based on large amounts of machine learning model data. In addition, the by utilizing parameterized notebooks, machine-learning visualization works well at scale (e.g., handles large volumes of data at a number of evaluation runs) and improves performance speeds.

In addition, the machine-learning visualization system can improve accuracy. For example, by improving access and insights to model performance the machine-learning visualization system can improve accuracy of the resulting model. For example, the machine-learning visualization system can provide visualizations and dynamically update the visualizations as changes occur (e.g., to the machine-learning model, the visualization recipe, and/or other factors affecting configuration of the machine-learning model). By dynamically providing visualizations, the machine-learning visualization system can provide insights regarding the most current performance of the machine-learning model, thereby allowing for improved responsiveness to changes and therefore more accurate machine-learning models. Furthermore, by providing suggested custom recipes, visualizations, architectures, or modifications, the machine-learning visualization system based on historical information, the machine-learning visualization system can further improve accuracy in training or implementing machine learning models.

Furthermore, the machine-learning visualization system can improve demonstration and comprehension of machine-learning model outputs and performance of the machine-learning model via dynamically-provided visualizations. For example, the machine-learning visualization system can provide various metrics, graphics, and other visual aids to help non-technical and technical persons alike better understand the machine-learning model performance and its outputs. In doing so, the machine-learning visualization system can enable data scientists and software engineers to more quickly build effective and performant machine-learning models at scale (within a notebook environment with which they engineers are familiar), while also allowing non-technical users (such as a customer, client, manager, etc.) to see a visual representation of how well and why complex machine-learning model perform.

In sum, the machine-learning visualization system empowers data scientist client devices to efficiently and quickly create custom visualizations for custom models using a notebook template within a familiar environment. The machine-learning visualization system can dynamically render these visualizations on the fly within a model insights user interface using parameterized notebooks that invisibly compute and render these visualizations during the model evaluation/optimization process. This approach makes the process more efficient and timely, hence leading to models that are more accurate and performant in their predictions.

As illustrated by the foregoing discussion, the present disclosure utilizes a variety of terms to describe features and benefits of the machine-learning visualization system. Additional detail is now provided regarding the meaning of these terms. For example, as used herein, the term "machine-learning model" refers to a model with one or more algorithms that can be tuned (e.g., trained) based on inputs to approximate unknown functions. In particular, the term machine-learning model can learn to approximate complex functions and generate outputs based on a plurality of inputs provided to the model. Examples of some machine-learning models include linear regression, logistic regression, decision trees, naïve Bayes, k-nearest neighbor, neural networks, long-short term memory, random forests, gradient boosting algorithms, deep learning architectures, classifiers, a combination of the foregoing, etc.

Relatedly, as used herein, the term "parameter value" refers to configurable values that make up a machine-learning model and/or values that relate to training, performance, etc. of the machine-learning model. In particular, a parameter value can include one or more metrics that reflect training, optimization, performance, or implementation of the machine learning model. To illustrate, a parameter value can indicate training time, training iterations, model weights, convergence measures, loss measures, model predictions, performance speeds, hyperparameters, or a variety of other values. As mentioned, the parameter values can be the one or more metrics that are analyzed to generate visualization data regarding the machine-learning model.

Additionally, as used herein, the term "parameterized notebook" (or "notebook") refers to an interactive, computer-executable workspace. In particular, the parameterized notebook can include a computer-implemented application that creates and/or shares documents that include live code, equations, visualizations, and/or narrative text. Thus, a parametrized notebook includes a headless notebook (i.e., notebook software without a graphical user interface) with executable code for generating visualization data. For example, a parameterized notebook can include a Jupyter Notebook.

Further, as used herein, the terms "recipe" (or "visualization recipe" or "user-defined visualization recipe") refer to computer-executable instructions. In particular, a user-defined visualization recipe can include computer-executable instructions for generating visualizations. For example, a user-defined visualization recipe can include instructions (e.g., defined by an engineer client device) for generating custom and/or non-standard visualizations (e.g., within a notebook). As used herein, the term "visualization" refers to a visual representation (e.g., a visualization related to a machine-learning model). In particular, a visualization can include a visual representation of performance of the machine-learning model. As examples, a visualization can include a chart, graph, plot, index, table, icon, image, video, interactive object, etc.

In addition, as used herein, the term "train" refers to utilizing information to tune or teach a machine-learning model. The term "training" (used as an adjective or descriptor, such as "training query" or "training data") refers to information or data utilized to tune or teach a machine-learning model. In some embodiments, the machine-learning visualization system trains a suggestion machine-learning model, for example, based on an interaction history.

As used herein, the term "interaction history" refers to a digital record of historical conduct. In particular, an interaction history can include a digital record of various machine-learning models and associated execution runs, visualization recipes, visualizations, and/or modifications. As an example, an interaction history may include a configuration or architecture of a machine-learning model, particular visualization designs used in a visualization recipe, initial parameters used to train a machine-learning model, changes made during an optimization or training process, etc.

Relatedly, as used herein, the term "suggestion" refers to a recommendation. In particular, a suggestion can include a recommendation for various machine-learning models and associated execution runs, visualization recipes, visualizations, and/or modifications. As an example, the suggestion machine-learning model can provide a suggestion to use a machine-learning model, visualization recipes, particular visualization designs, initial parameters to train a machine-learning model, changes to make during an optimization or training process (e.g., how to tune hyperparameters), etc.

As further used herein, the term "computer-executable instructions" refers to executable computer code, an executable computer file, or an executable computer program. In particular, computer-executable instructions refers to computer-executable code, files, programs, etc. that relate to various machine-learning models and associated execution runs, visualization recipes, and/or modifications to the foregoing. Relatedly, the term "runtime language" refers to a programming language of computer-executable instructions. Examples of runtime languages can include Python, Java, Ruby, HyperText Markup Language (HTML), JavaScript, C language, C++, R language, Structured Query Language, Scala, Spark, Pyspark, etc.

Additional detail will now be provided regarding the machine-learning visualization system in relation to illustrative figures portraying example embodiments and implementations of the machine-learning visualization system. For example, FIG. 1 illustrates a computing system environment (or "environment") 100 for implementing a machine-learning visualization system 106 in accordance with one or more embodiments. As shown in FIG. 1, the environment 100 includes server(s) 102, a client device 108, an administrator device 112, a network 116, and a third-party server 118. Each of the components of the environment 100 can communicate via the network 116, and the network 116 may be any suitable network over which computing devices can communicate. Example networks are discussed in more detail below in relation to FIG. 9.

As shown in FIG. 1, the environment 100 includes the client device 108. The client device 108 can be one of a variety of computing devices, including a smartphone, tablet, smart television, desktop computer, laptop computer, virtual reality device, augmented reality device, or other computing device as described in relation to FIG. 9. Although FIG. 1 illustrates a single client device 108, in some embodiments the environment 100 can include multiple client devices 108. The client device 108 can further communicate with the server(s) 102 via the network 116. For example, the client device 108 can receive user input and provide information pertaining to the user input (e.g., that relates to a status update of performance for a machine-learning model) to the server(s) 102.

As shown, the client device 108 includes a corresponding client application 110. In particular, the client application 110 may be a web application, a native application installed on the client device 108 (e.g., a mobile application, a desktop application, etc.), or a cloud-based application where part of the functionality is performed by the server(s) 102. The client application 110 can present or display information to a user associated with the client device 108, including information that is responsive to a query (e.g., a machine-learning model performance request). In addition, the user can interact with the client application 110 to provide user input to, for example, access a visualization for a machine-learning model.

As mentioned, the environment 100 includes the administrator device 112. The administrator device 112 can include a variety of computing devices as described in relation to FIG. 9. The administrator device 112 can perform a variety of administrative, engineering, or design functions, such as generating and/or providing a user-defined visualization recipe for a machine-learning model, designing or modifying a machine learning-model, and/or displaying visualizations. Although FIG. 1 illustrates a single administrator device 112, in some embodiments the environment 100 can include multiple different administrator devices 112. The administrator device 112 can further communicate with the server(s) 102 via the network 116 through an administrator application 114. Similar to the client application 110, the administrator application 114 may be a web application, a native application installed on the administrator device 112 (e.g., a mobile application, a desktop application, etc.), or a cloud-based application where part of the functionality is performed by the server(s) 102. For example, the administrator device 112 can receive user input via the administrator application 114 and provide information pertaining to the user input (e.g., for configuring visualizations associated with a machine-learning model) to the server(s) 102.

As illustrated in FIG. 1, the environment 100 includes the server(s) 102. The server(s) 102 may learn, generate, store, receive, and transmit electronic data, such as executable instructions for executing a machine-learning model, generating a parameterized notebook based on a visualization recipe, providing parameter values corresponding to a machine-learning model to the parameterized notebook for applying the visualization recipe, extracting visualization data corresponding to the machine-learning model from the parameterized notebook, and generating a visualization based on the visualization data for display in a graphical user interface (e.g., of the administrator device 112 and/or the client device 108). For example, the server(s) 102 may receive data from the client device 108 and/or the administrator device 112 based on a user input to check the status/performance of a machine-learning model. In turn, the server(s) 102 can transmit data (e.g., a visualization associated with the machine-learning model) back to the client device 108 and/or an administrator device 112.

In these or other embodiments, the server(s) 102 can communicate with the client device 108 and the administrator device 112 to transmit and/or receive data via the network 116. In some embodiments, the server(s) 102 comprises a content server and/or a data collection server. The server(s) 102 can also comprise an application server, a communication server, a web-hosting server, a social networking server, or a digital content management server.

Although FIG. 1 depicts the machine-learning visualization system 106 located on the server(s) 102, in some embodiments, the machine-learning visualization system 106 may be implemented by on one or more other components of the environment 100 (e.g., by being located entirely or in part at one or more of the other components). For example, machine-learning visualization system 106 may be implemented by the client device 108, the administrator device 112, and/or a third-party device.

As shown in FIG. 1, the machine-learning visualization system 106 is implemented as part of a digital content management system 104 located on the server(s) 102. The digital content management system 104 can organize, manage, and/or execute handling of intelligent services (e.g., as described further below in conjunction intelligent services 210 of FIG. 2). For example, the digital content management system 104 can identify performance/status queries of a machine-learning model associated with an intelligent service and direct the machine-learning visualization system 106 to respond accordingly.

In some embodiments, though not illustrated in FIG. 1, the environment 100 may have a different arrangement of components and/or may have a different number or set of components altogether. For example, the client device 108, the administrator device 112, and/or the third-party server 118 may communicate directly with the machine-learning visualization system 106, bypassing the network 116.

Figure 2:
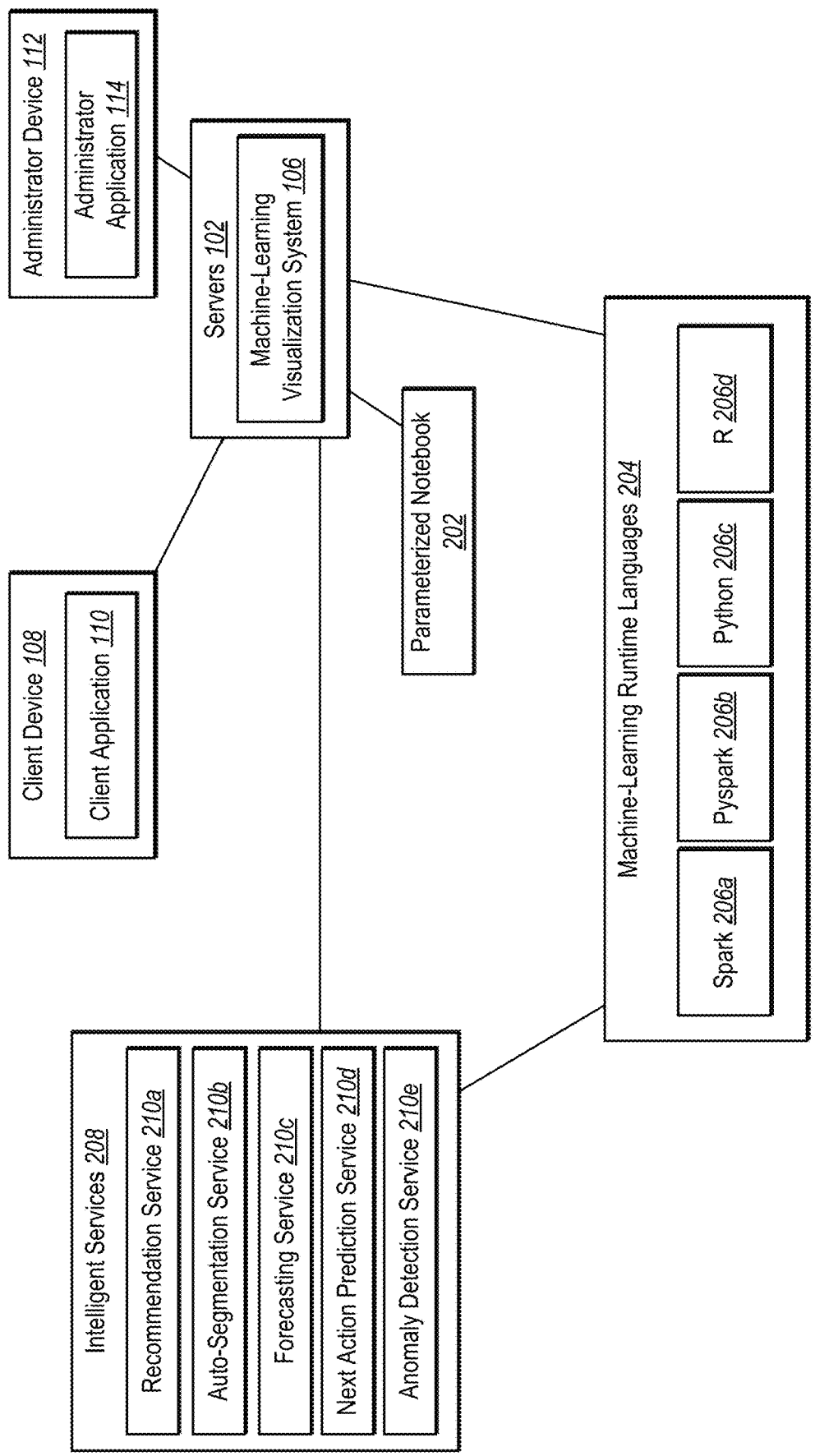
FIG. 2 illustrates another diagram of a system environment including a machine-learning visualization system in accordance with one or more embodiments.

As mentioned briefly above, by implementing the machine-learning visualization system data scientists can perform experimentation and model building in their preferred machine-learning environment, and behind the scenes, the machine-learning visualization system 106 can apply a runtime framework that automatically extracts relevant information and passes it to an insights service backend which then invokes and triggers the evaluation visualizations using parametrized notebooks. For example, FIG. 2 illustrates such an implementation of the machine-learning visualization system 106 in accordance with one or more embodiments. In particular, FIG. 2 illustrates that the machine-learning visualization system 106 utilizes a parameterized notebook 202 (hosted at the server(s) 102 or a third-party server) to adaptively generate visualizations regarding machine-learning models associated with the intelligent services 208. In turn, the machine-learning visualization system 106 provides the generated visualizations to the client application 110 of the client device 108 and/or the administrator application 114 of the administrator device 112 (e.g., in response to a status/performance query from one or both of the client device 108 or the administrator device 112).

In more detail, the intelligent services 208 include a variety of services that utilize various machine learning models. For example, in relation to FIG. 2, the intelligent services 208 include a recommendation service 210a (e.g., digital content recommendations for client devices), an auto-segmentation service 210b (e.g., segmenting or identifying objects portrayed in digital images), a forecasting service 210c (e.g., predicting client device conduct), a next action prediction service 210d, and an anomaly detection service 210e. In some embodiments, one or more of the intelligent services 210a-210e can be an intelligent web service (e.g., deployed in the cloud) that utilizes one or more trained machine-learning models to perform operational tasks in an on-demand fashion based on client data. To build, train, and/or optimize such a machine-learning model that performs operational tasks as part of one of the intelligent services 210a-210e, an administrator associated with the administrator device 112 can use the parameterized notebook 202 and the machine-learning visualization system 106 to adaptively generate visualizations.

In particular, the parameterized notebook 202, includes custom recipes that, when executed, provide visualization data regarding a machine-learning model tied to the intelligent services 208. In addition, the custom recipes of the parameterized notebook 202 can include one or more of the machine-learning runtime languages 204, including example runtime languages 206a-206d. Additionally or alternatively, a machine-learning model associated with one of the intelligent services 208 may include one or more of the machine-learning runtime languages 204. In other embodiments, the parameterized notebook 202 can include a recipe for various types of visualizations. For example, the parameterized notebook 202 can include a template notebook with a recipe (e.g., ready for populating with parameters, customizing, and/or out-of-the-box execution) to generate visualization data corresponding to one or more standard and/or non-standard visualizations. Accordingly, the machine-learning visualization system 106 can provide both standard and non-standard visualizations based on one or more notebooks that include standard recipes and custom recipes.

As described above, the parameterized notebook 202 can be applied to a variety of machine-learning models associated with different respective machine-learning runtime languages. For example, the parameterized notebook 202 can include computer-executable instructions in Python 206c, and a machine-learning model associated with one or more of the intelligent services 208 can include computer-executable instructions in Spark 206a. In this manner, a technical person associated with the administrator device 112 can flexibly and more conveniently build the parameterized notebook 202 with a user-defined visualization recipe and without prohibitive runtime language constraints.

The machine-learning visualization system 106 can extract parameter values from the machine learning models corresponding to the intelligent services 208. For example, the machine learning visualization system 106 can utilize tags, features, or variables encoded in the parameterized notebook 202 to identify and extract parameter values from the intelligent services 208. In response to particular triggers (e.g., identifying new parameter values, conclusion of execution of a machine learning model, elapsed time period, request from a client device), the machine learning visualization system 106 can execute the parameterized notebook 202 to generate visualization data.

Once the parameterized notebook 202 is executed, the machine-learning visualization system 106 can generate visualizations based on visualization data from the executed parameterized notebook 202. For example, the machine-learning visualization system 106 can provide intuitive insights (i.e., visualizations) to the administrator device 112 and/or the client device 108 regarding the most current performance of a machine-learning model tied to one of the intelligent services 210a-210e. In so doing, the machine-learning visualization system 106 allows for technical persons associated with the administrator device 112 to respond more quickly and easily to performance changes in the machine-learning model. Likewise, the machine-learning visualization system 106 allows for a non-technical person (e.g., a client/customer) associated with the client device 108 to check how well a selected intelligent service of the intelligent services 208 is performing based on the client/customer data.

Figure 3:
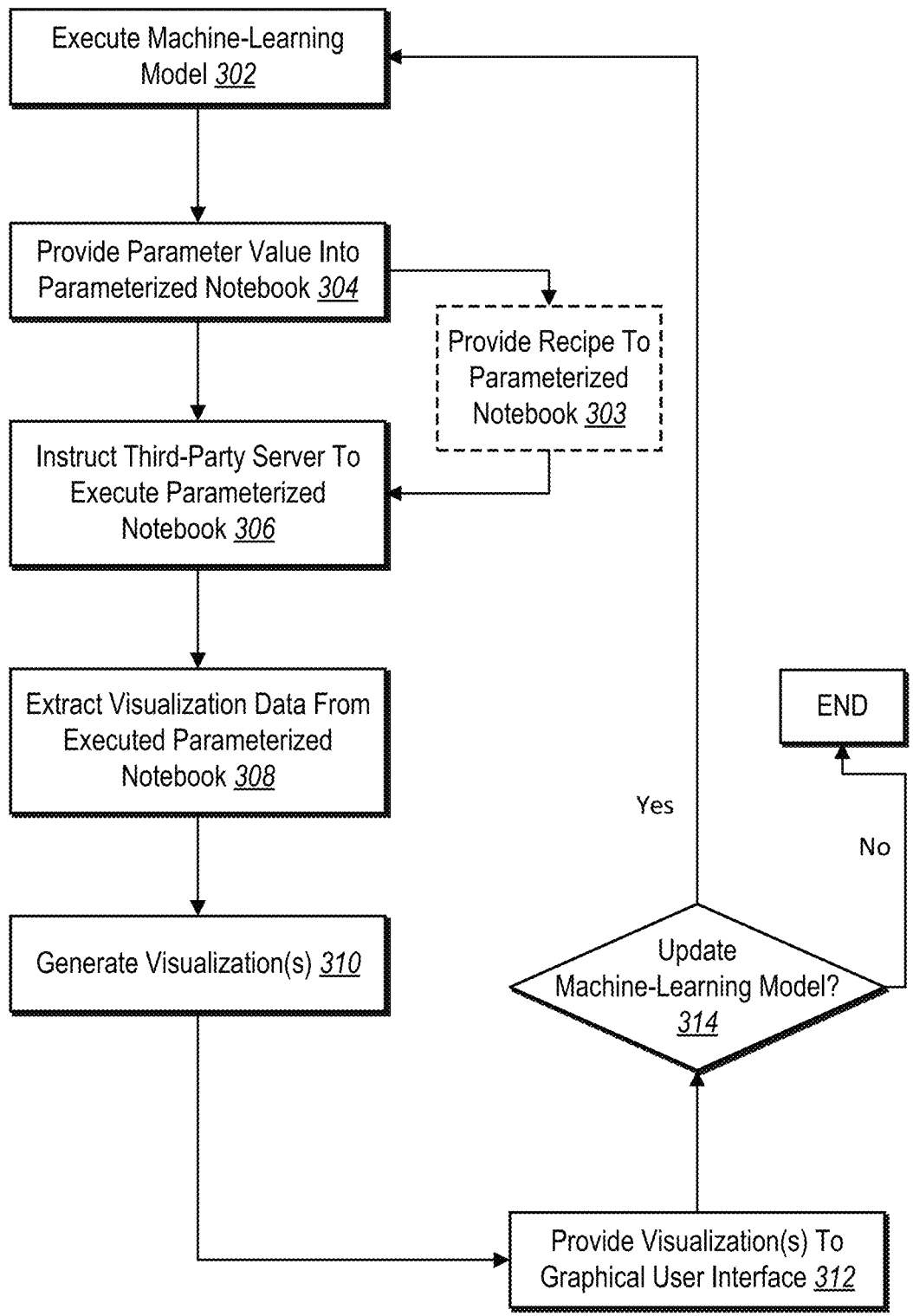
FIG. 3 illustrates an example process flow of acts for providing visualizations to a graphical user interface in accordance with one or more embodiments.

As mentioned above, the machine-learning visualization system 106 utilizes a parameterized notebook to adaptively generate visualizations regarding a machine-learning model. FIG. 3 illustrates an example process flow of acts for providing visualizations to a graphical user interface in an iterative manner, in accordance with one or more embodiments of the present disclosure. While FIG. 3 illustrates acts according to one embodiment, alternative embodiments may omit, add to, reorder, and/or modify any of the acts shown in FIG. 3.

As shown in FIG. 3, the process flow includes an act 302 to execute a machine-learning model. In some embodiments, the machine-learning visualization system 106 executes the machine-learning model, while in other embodiments, a different system (e.g., the third-party server 118) executes the machine-learning model. For example, the machine-learning visualization system 106 can utilize a third-party server to train a machine-learning model (or apply a machine-learning mode to new input data). To illustrate, the machine-learning visualization system can execute the machine-learning model by applying a set of data (e.g., client data, training data, etc.) to the machine-learning model to generate results (e.g., a prediction) based on internal weights of the machine-learning model.

In addition, as illustrated in FIG. 3, the machine-learning visualization system 106 performs an act 303 of providing a recipe to a notebook (e.g., to generate a parameterized notebook). For example, the machine-learning visualization system 106 can receive user input of visualization preferences (e.g., via the administrator device 112). For example, an engineer utilizing the administrator device 112 can provide a user-defined visualization recipe by entering Python code specifying the extraction tags, visualizations, parameters, triggers, and rules for generating one or more visualizations. The machine-learning visualization system 106 can populate a parameterized notebook with the user-defined visualization recipe (e.g., enter the Python code into a Python Notebook).

In relation to FIG. 3, the machine-learning visualization system 106 also performs an act 304 of providing the parameter values of the machine learning model to the parameterized notebook. In particular, the machine-learning visualization system 106 (or a third-party server) can apply the user-defined visualization recipe of the parameterized notebook to the parameter values determined from executing the machine learning model (e.g., at the act 302). By applying the user-defined visualization recipe to the parameter values, machine-learning visualization system 106 can generate visualization data, including various databases, tables, arrays, or visualizations (e.g., graphs or charts).

At act 308, the machine-learning visualization system 106 extracts visualization data from the executed parameterized notebook (e.g., by utilizing a scraper tool). For instance the machine-learning visualization system 106 can extract tabular and image output (e.g., base64 image output) from an executed notebook. In some embodiments, the machine-learning visualization system 106 utilizes a scraper tool to identify certain output types or formats of the visualization data. For instance, the machine-learning visualization system can identify visualization data formats (e.g., JSON or JAVASCRIPT) and convert the visualization data to alternative formats (e.g., png or HTML).

Moreover, as illustrated, the machine-learning visualization system 106 also performs an act 310 of generating visualization(s). In particular, the machine-learning visualization system 106 generates visualizations based on the extracted visualization data (e.g., by converting extracted visualization data from a first format to a second format compatible with a graphical user interface). For example, the machine-learning visualization system 106 can utilize a parameterized notebook service to transmit all tabular and image data extracted from the executed notebook. The machine-learning visualization system 106 can then generate visualizations based on the tabular and image data.

As shown in FIG. 3, the machine-learning visualization system 106 performs an act 312 of providing visualization(s) to a graphical user interface. For example, the machine-learning visualization system 106 can provide visualizations to a graphical user interface of the client device 108 or the administrator device 112. As mentioned above, the machine-learning visualization system 106 can provide a variety of custom, specialized visualizations unique to particular features or characteristics of non-standard machine learning models. Additional detail regarding exemplary visualizations provided via user interfaces is provided below (e.g., in relation to FIGS. 6A-6F).

As shown, the machine-learning visualization system 106 also performs an act 314 of determining whether to update the machine-learning model. As illustrated, upon updating the machine-learning model, the machine-learning visualization system 106 can repeat all (or a subset) of the acts 302-310. Although FIG. 3 illustrates repeating the acts 302-312 in response to updating the machine-learning model, the machine-learning visualization system 106 can execute a parameterized notebook and generate new visualizations in response to a variety of triggers. For example, the machine-learning visualization system 106 can repeat the acts 304-312 in response to receiving a request from a client device for updated visualizations, in response to a threshold amount of time elapsing, in response to detecting a modification of one or more features or characteristics of a machine learning model, and/or in response to detecting that a machine-learning model has completed a particular iteration or implementation run.

Figure 4:
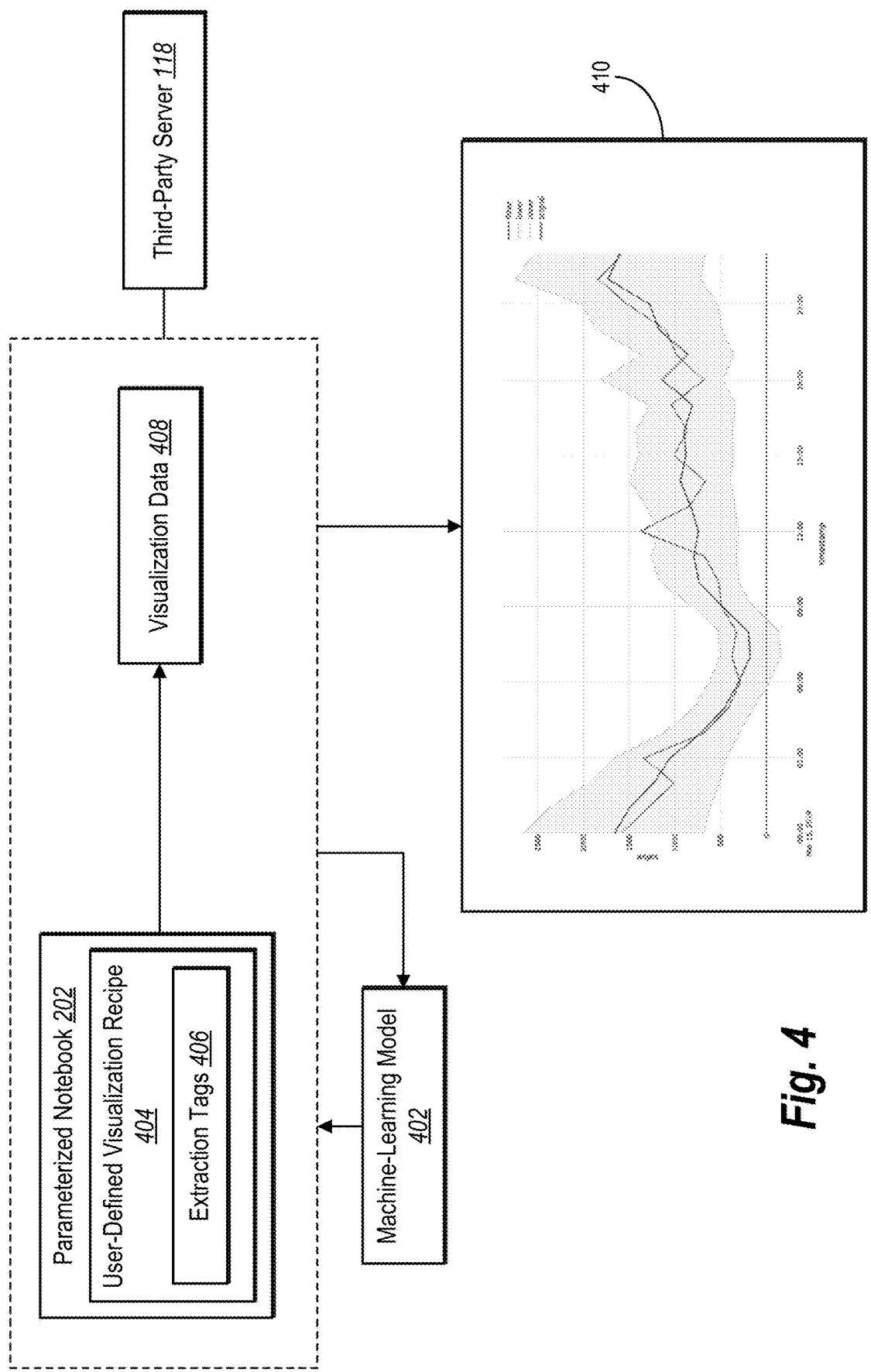
FIG. 4 illustrates a schematic of the machine-learning visualization system utilizing a parameterized notebook with a user-defined visualization recipe to generate a visualization in accordance with one or more embodiments.

As mentioned above, the machine-learning visualization system 106 utilizes a parameterized notebook to adaptively generate visualizations regarding a machine-learning model. FIG. 4 illustrates a schematic of the machine-learning visualization system 106 utilizing the parameterized notebook 202 with a user-defined visualization recipe 404 in order to generate a visualization 410 in accordance with one or more embodiments of the present disclosure.

The machine-learning visualization system 106 can utilize, store, and/or access a variety of notebooks. For example, the machine-learning visualization system 106 can access a repository of parameterized notebooks that include template parameterized notebooks (e.g., pre-populated notebooks that include instructions corresponding to standard visualizations), completed parameterized notebooks (e.g., notebooks with custom recipes from previous projects), in-progress parameterized notebooks (e.g., notebooks with custom recipes currently being utilized by active projects), and/or other categories of visualizations/parameterized notebooks (e.g., visualizations in augmented reality, virtual reality, etc.). The machine-learning visualization system 106 can create a new notebook, access an existing notebook, or suggest a notebook for a particular user or client device.

As shown, a machine-learning model 402 can provide parameter values to the machine-learning visualization system 106, and/or the machine-learning visualization system 106 can obtain parameter values from the machine-learning model 402 (e.g., by request). With the parameter values from the machine-learning model 402, the machine-learning visualization system 106 can populate the user-defined visualization recipe 404. In particular, the user-defined visualization recipe 404 can include one or more variables that the machine-learning visualization system 106 can populate with the parameter values from the machine-learning model 402. For example, in a first code cell of the parameterized notebook 202 and/or the user-defined visualization recipe 404 specifically, the machine-learning visualization system 106 can populate variables used for executing the parameterized notebook 202.

In addition, as shown in FIG. 4, the user-defined visualization recipe 404 includes extraction tags 406. The extraction tags 406 designate portions of the notebook to extract upon execution of the parameterized notebook 202. In particular, the machine-learning visualization system 106 can utilize the extraction tags 406 to identify what visualization data to extract from the executed parameterized notebook (e.g., as part of visualization data 408).

In more detail, the machine-learning visualization system 106 can instruct the third-party server 118 to execute the parameterized notebook 202 and, in particular, the user-defined visualization recipe 404 that includes the populated parameter values from the machine-learning model 402. Then upon execution of the parameterized notebook 202, the machine-learning visualization system 106 can scrape the visualization data 408 from the executed parameterized notebook 202. Additionally or alternatively, in some embodiments, the machine-learning visualization system 106 scrapes the visualization data 408 and then converts the visualization data 408 from a first format to a second format that is compatible with presentation in a graphical user interface. For example, the machine-learning visualization system 106 can convert the visualization data 408 from a first format or type of output (e.g., a tabular format, a JavaScript format, a JavaScript object notation format, or a scalable vector graphics format) into a second format or type of output comprising at least one of a portable network graphics format or an HTML format.

In turn, the machine-learning visualization system 106 can generate the visualization 410 and provide the visualization 410 to a graphical user interface as described above in relation to FIG. 3. For example, the machine-learning visualization system 106 can utilize HTML visualizations to populate a web-application user interface with the custom visualizations specified in the recipe from the parameterized notebook. In particular, the machine-learning visualization system 106 can designate or otherwise reserve, within the web-application user interface, an HTML object or other appropriate container (e.g., a JavaScript container) for populating with the custom visualizations specified in the recipe from the parameterized notebook.

In addition, and as also described above in relation to FIG. 3, the machine-learning visualization system 106 can iteratively perform the foregoing. For example, the machine-learning visualization system 106 can re-execute the machine-learning model in addition to re-execution of the parameterized notebook 202 to generate a second visualization regarding the machine-learning model 402. In particular, the machine-learning visualization system 106 can generate a second set of parameter values from re-executing the machine-learning model 402 that are different from the first set of parameter values described above. In turn, the machine-learning visualization system 106 can provide the second set of parameter values to the parameterized notebook 202 for re-executing the user-defined visualization recipe 404 with the second set of parameter values. Upon re-execution of the user-defined visualization recipe 404 with the second set of parameter values, the machine-learning visualization system 106 can then extract a second set of visualization data, based on which the machine-learning visualization system 106 can generate a new visualization for display in a graphical user interface.

Figure 5A:
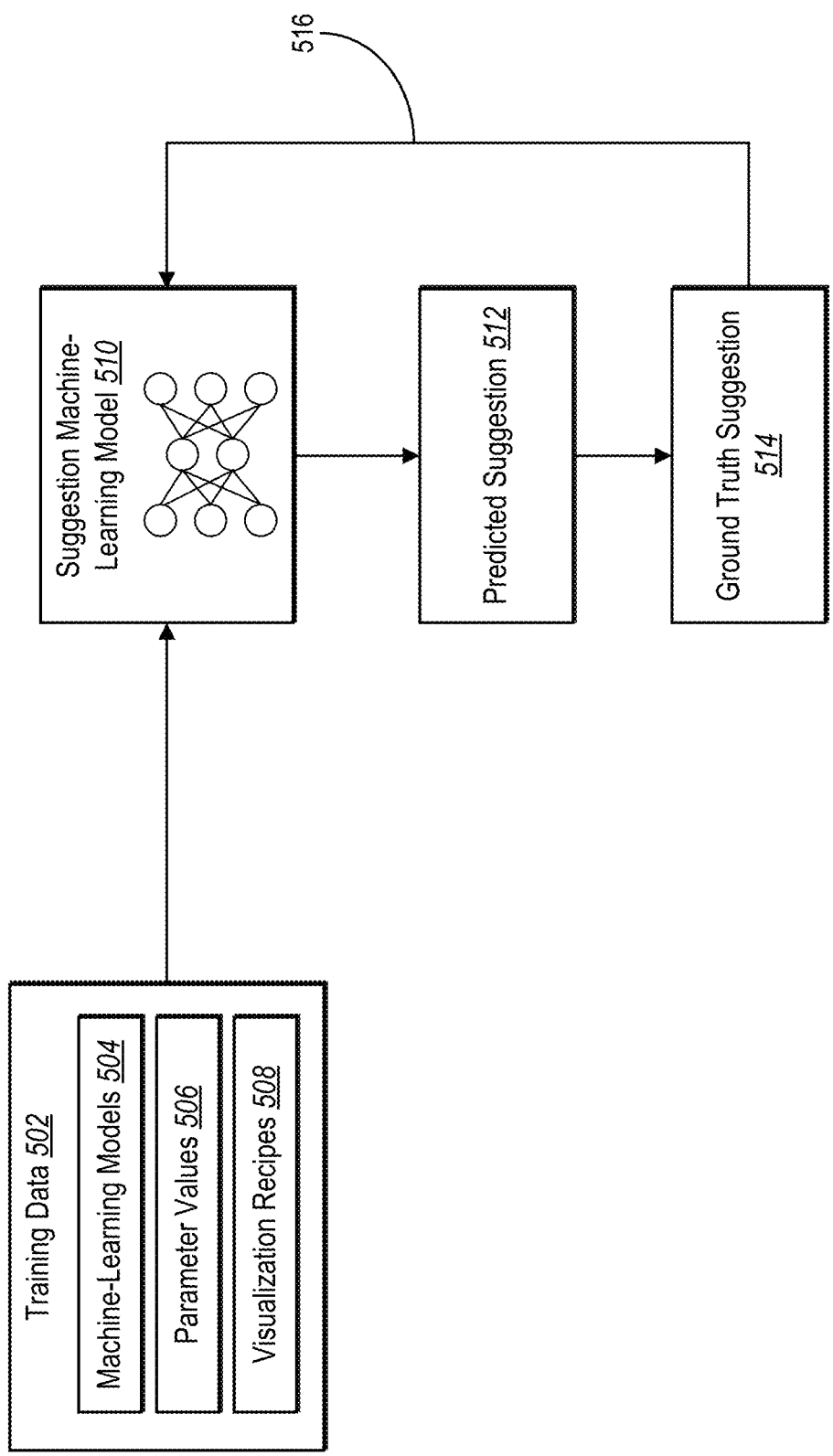
FIG. 5A illustrates an example process for training a suggestion machine-learning model in accordance with one or more embodiments of the present disclosure.

As mentioned above, the machine-learning visualization system 106 can also generate suggestions corresponding to machine-learning models, including suggestions corresponding to visualizations, recipes, architectures, hyperparameters, or modifications. In particular, the machine-learning visualization system 106 can train a machine-learning model to generate such suggestions. FIG. 5A illustrates an example process for training a suggestion machine-learning model 510 in accordance with one or more embodiments of the present disclosure. In particular, by using the training data 502, the suggestion machine-learning model 510 can learn what suggestions to provide to a user (e.g., regarding a machine-learning model, a visualization design, a visualization recipe, initial parameters to train a machine-learning model, changes to make during an optimization or training process, etc.).

As shown, the machine-learning visualization system 106 provides training data 502 to the suggestion machine-learning model 510 in which the training data 502 includes machine-learning models 504, parameter values 506, and visualization recipes 508. The machine-learning models 504 includes a repository of trained machine-learning models used by one or more users in conjunction with the machine-learning visualization system 106. In addition, the parameter values 506 includes a repository of the parameters that correspond to respective trained machine-learning models of the machine-learning models 504. Similarly, the visualization recipes 508 includes a repository of the visualization recipes of parameterized notebooks that correspond to respective trained machine-learning models of the machine-learning models 504 (as well as visualizations generated for the machine-learning model).

Based on the learning facilitated by the training data 502 described above, the suggestion machine-learning model 510 can generate a predicted suggestion 512 (e.g., based on a training suggestion score for each possible training suggestion in a set of possible training suggestions). The machine-learning visualization system 106 can then compare the predicted suggestion 512 to a ground truth suggestion 514.

The ground truth suggestion 514 can utilizes events from an interaction history as a ground truth. For example, given a scenario in which the suggestion machine-learning model 510 is trained to suggest visualizations for machine-learning models, the machine-learning visualization system 106 can utilize historical visualizations (selected by engineers) as the ground truth suggestion 514.

As mentioned above, the machine-learning visualization system 106 can generate a variety of suggestions, such as a suggested visualization, a suggested hyperparameter, and so forth. The machine-learning visualization system 106 can train the suggestion machine-learning model 510 to generate a variety of different outputs (e.g., by utilizing different combinations of input data and ground truth data). For example, given another scenario in which the suggestion machine-learning model 510 is trained to suggest modifications to visualization recipes, then the ground truth suggestion 514 can include a historical visualization recipe as a ground truth. With the ground truth suggestion 514, the machine-learning visualization system 106 can compare the predicted suggestion 512 with the ground truth suggestion 514 to determine loss data via a loss function 516.

Examples of a loss function 516 can include a regression loss function (e.g., a mean square error function, a quadratic loss function, an L2 loss function, a mean absolute error/L1 loss function, mean bias error, etc.). Additionally or alternatively, the loss function 516 can include a classification loss function (e.g., a hinge loss/multi-class SVM loss function, cross entropy loss/negative log likelihood function, etc.). Further, the loss function 516 can return quantifiable data regarding the difference between the predicted suggestion 512 and the ground truth suggestion 514. In particular, the loss function 516 can return such loss data to the suggestion machine-learning model 510 where the machine-learning visualization system 106 can adjust various parameters/weights to improve the quality/accuracy of the predicted suggestion 512 by reducing the loss. Moreover, the training/learning of the suggestion machine-learning model 510 can be an iterative process (as shown by the return arrow between the ground truth suggestion 514 and the suggestion machine-learning model 510) such that the machine-learning visualization system 106 can continually adjust parameters/hyperparameters of the suggestion machine-learning model 510 over learning cycles.

The suggestion machine-learning model 510 can include a variety of machine-learning models. For example, in some embodiments, the suggestion machine-learning model 510 comprises a convolutional neural network utilized to predict a suggestion class from a plurality of suggestions. In other embodiments, the suggestion machine-learning model 510 can include alternative machine-learning models (as described above). Accordingly, the training process illustrated in FIG. 5A can be modified depending on the type of machine-learning model being trained with the training data 502.

Figure 5B:
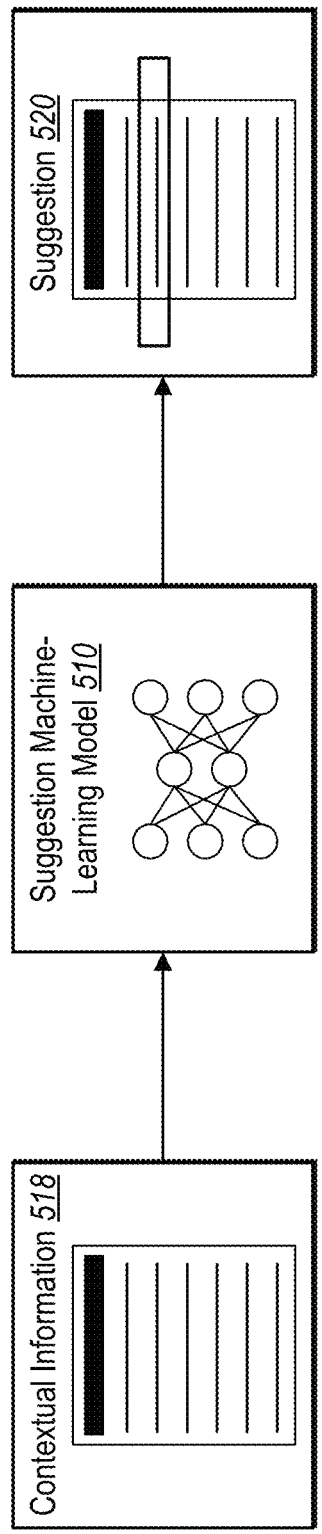
FIG. 5B illustrates an example implementation of the suggestion machine-learning model in generating a suggestion in accordance with one or more embodiments.

In relation to FIG. 5A describing a training process of the suggestion machine-learning model 510, FIG. 5B illustrates an example implementation process in which the suggestion machine-learning model 510 generates a suggestion 520 in accordance with one or more embodiments. As shown, the machine-learning visualization system 106 can provide contextual information 518 to the suggestion machine-learning model 510 for generating the suggestion 520.

The contextual information 518 can include information relating to a machine-learning model, parameter values, visualization recipes, evaluation rules (e.g., constraints for training/optimizing the suggestion machine-learning model 510), user preferences, etc. that the machine-learning visualization system 106 can apply as inputs to the suggestion machine-learning model 510. In turn, the suggestion machine-learning model 510 can make an intelligent determination in accordance with the training described above in relation to FIG. 5A. For example, given the suggestion machine-learning model 510 is trained to suggest visualizations, and given a machine-learning model as part of the contextual information 518, the suggestion machine-learning model 510 can suggest a visualization as the suggestion 520 based on similarities to other machine-learning models.

Thus, based on the contextual information 518, the suggestion machine-learning model 510 can generate the suggestion 520 and then surface the suggestion 520 to the user and/or automatically implement the suggestion 520 via the machine-learning visualization system 106. In this manner for instance, a user working on developing a visualization recipe for a complex machine-learning model and/or complex visualization need not re-write the visualization recipe from nothing. Instead, the suggestion 520 enables a user to advantageously employ the groundwork previously performed in conjunction with the machine-learning visualization system 106 and continue further customization. Similarly, in other embodiments, the suggestion 520 can include recommended architectures of a machine-learning model, modifications to hyperparameters, visualizations, etc. that the user can implement. For example, given the suggestion machine-learning model 510 is trained to suggest a particular architecture of a machine-learning model, and given one or more objectives (e.g., an application of the machine-learning model) as part of the contextual information 518, the suggestion machine-learning model 510 can recommend a particular architecture of the machine-learning model as the suggestion 520 based on similarities to other objectives with corresponding machine-learning models.

As mentioned above, because the machine-learning visualization system 106 is extensible, the system can provide suggestions or visualizations using other intelligent tools. For example, the machine-learning visualization system 106 can provide a visualization and/or suggestion utilizing MAGIX, DeepCompare, etc. For example, in some embodiments, MAGIX can explain a machine-learning model's behavior. In particular, MAGIX can explain a model's behavior through feature conditions using reverse inference powered by a LIME genetic algorithm as described by Nikaash Puri, Piyush Gupta, Pratiksha Agarwal, Sukriti Verma, and Balaji Krishnamurthy in MAGIX: MODEL AGNOSTIC GLOBALLY INTERPRETABLE EXPLANATIONS by Puri et al. and available at arXiv:1706; 07160, the contents of which are herein expressly incorporated by reference. Thus, in some embodiments, the machine-learning visualization system 106 may surface, in connection with a given machine-learning model, visualizations illustrating parameter values from the MAGIX model and/or suggestions based on explanations from the MAGIX model.

Additionally or alternatively, DeepCompare can compare machine-learning models for determining which machine-learning model to utilize. For example, in some embodiments, DeepCompare can provide insights into model behavior and assess tradeoffs therebetween as described in DEEPCOMPARE: VISUAL AND INTERACTIVE COMPARISON OF DEEP LEARNING MODEL PERFORMANCE by Murugesan et al. and published in IEEE Computer Graphics and Applications (Vol. 39, Issue 5, published May 27, 2019), the contents of which are herein expressly incorporated by reference in their entirety. Thus, in some embodiments, the machine-learning visualization system 106 may surface, in connection with a given machine-learning model, visualizations based on the models utilized by DeepCompare and/or provide suggestion 520 in a graphical user interface along with a DeepCompare output explaining benefits/drawbacks of the given machine-learning model in comparison to another machine-learning model.

As mentioned above, the machine-learning visualization system 106 adaptively generates visualizations regarding a machine-learning model. FIGS. 6A-6F illustrate example user interfaces 604a-604f with visualizations on a computing device 602 for interacting with the machine-learning visualization system 106 in accordance with one or more embodiments. In particular, the user interfaces 604a-604f illustrate the machine-learning visualization system 106 generating and providing non-standard visualizations, that can dynamically respond to various changes over time, change for a particular machine-learning model, and/or change for different machine-learning models (utilizing the same visualization recipe).

Figure 6A:
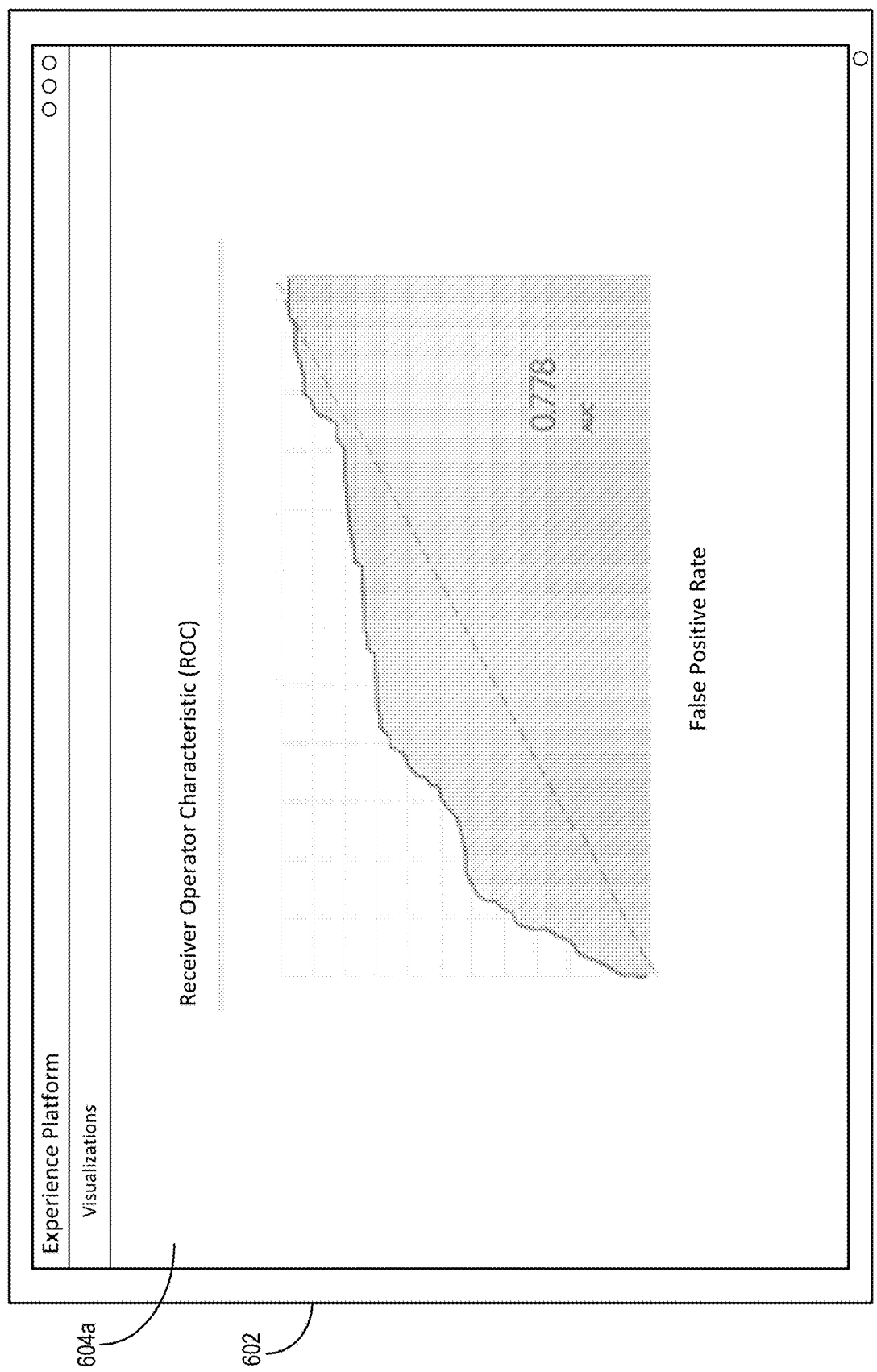
FIGS. 6A-6F illustrate example user interfaces with visualizations on a computing device for interacting with the machine-learning visualization system in accordance with one or more embodiments.

For example, as shown in FIG. 6A, the machine-learning visualization system 106 causes the computing device 602 to display the user interface 604a with visualizations comprising a receiver operator characteristic (ROC) chart and a corresponding AUC score. The machine-learning visualization system 106 automatically generates this non-standard visualization based on a custom recipe in a parameterized notebook and based on the parameter values determined upon execution of a corresponding machine learning model.

Figure 6B:
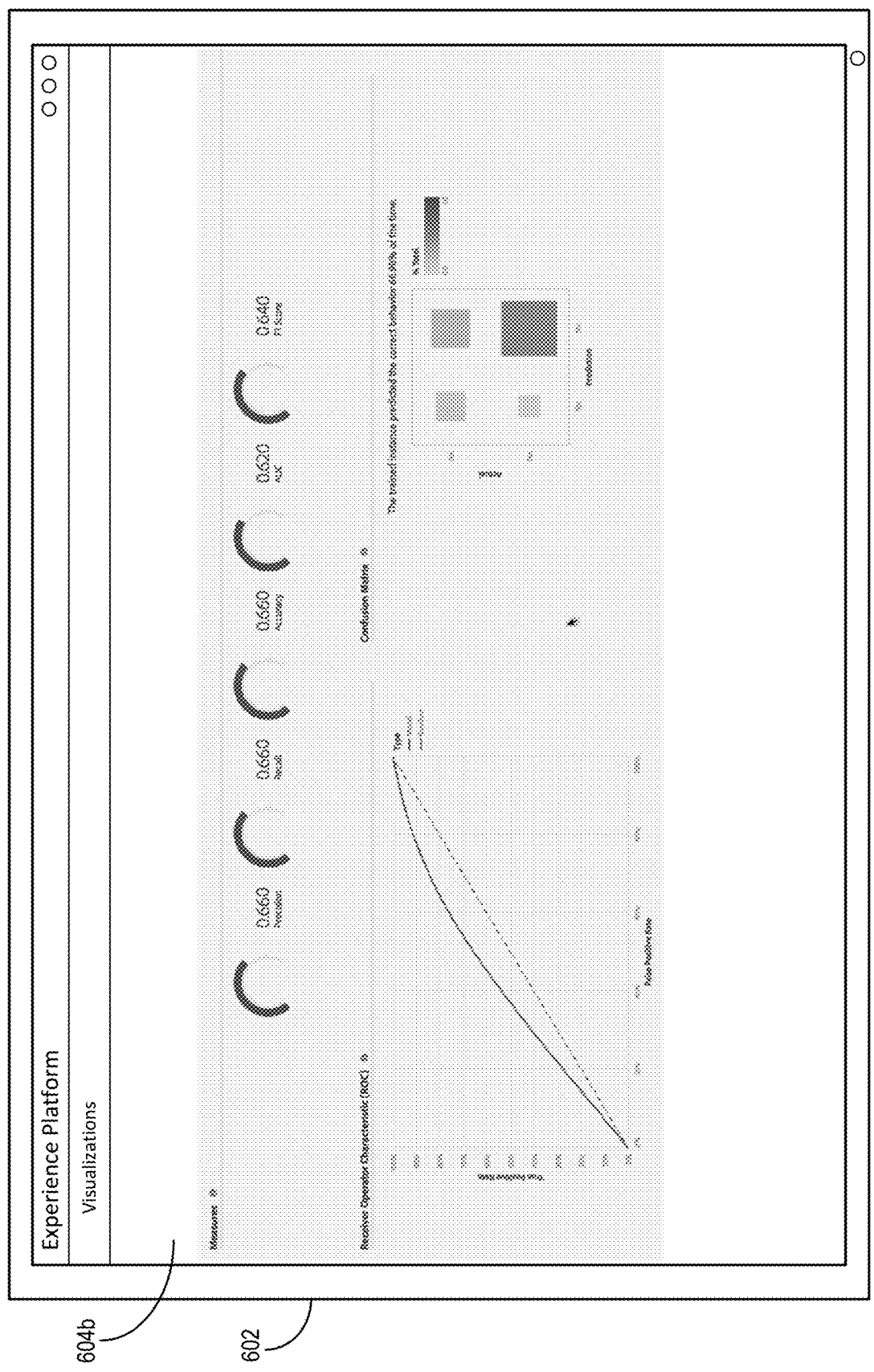

Similarly, in FIG. 6B, the machine-learning visualization system 106 causes the computing device 602 to display the user interface 604b with visualizations comprising various example metrics that include precision, recall, accuracy, AUC, and FI score. In addition, the user interface 604b includes visualizations of a confusion matrix and another ROC chart. In some embodiments, FIG. 6B illustrates a dynamic aspect of the machine-learning visualization system 106. Indeed, the machine-learning visualization system 106 can transition from the user visualization illustrated in FIG. 6A to the illustrated in FIG. 6B based on a custom recipe in a parameterized notebook and changes to a machine learning model. Indeed, a parameterized notebook can dictate different visualizations based on different triggers and/or machine learning models. Accordingly, the machine-learning visualization system 106 can dynamically modify pertinent visualizations as a machine-learning model or other circumstances change.

Figure 6C:
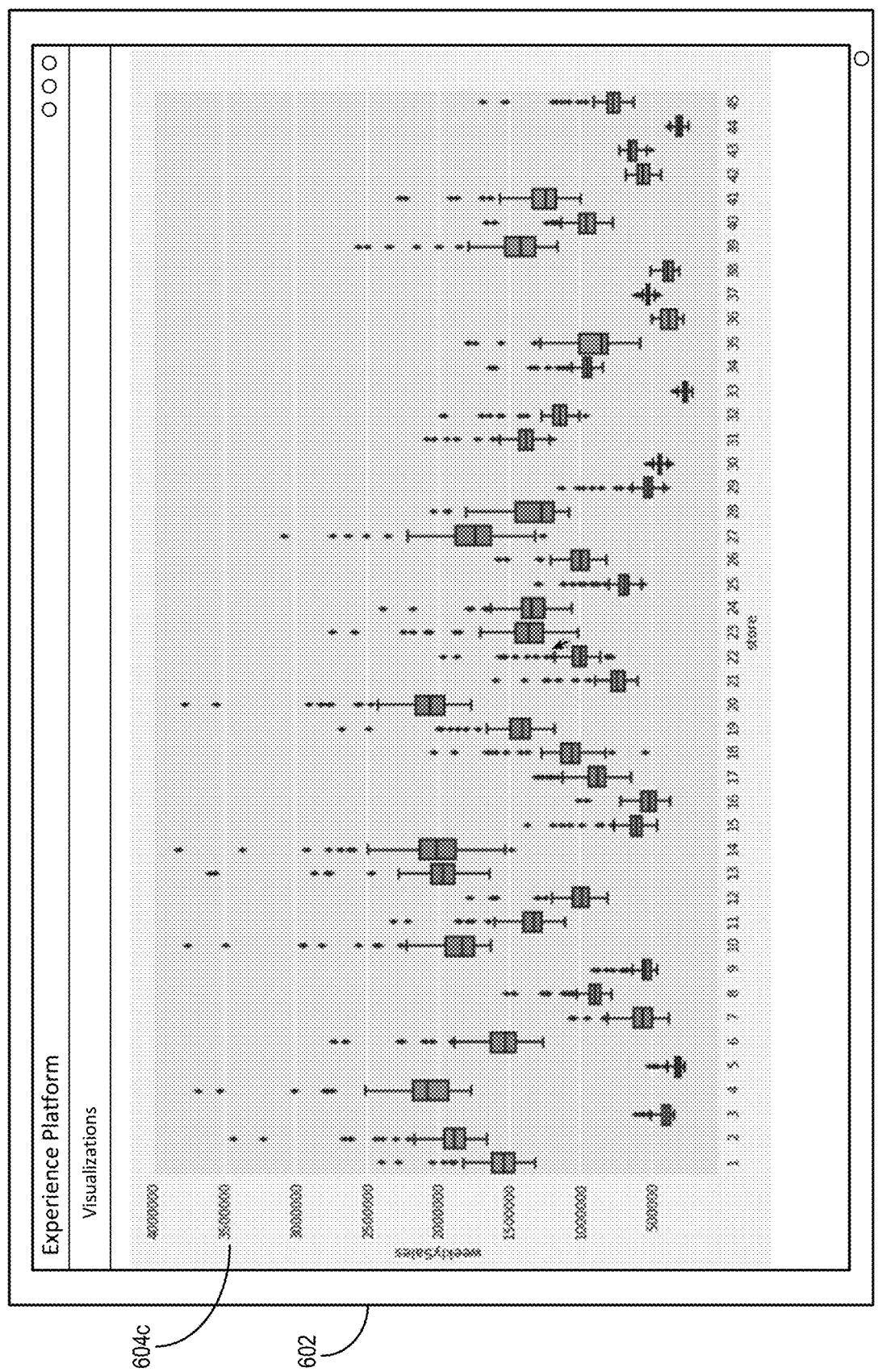
Figure 6D:
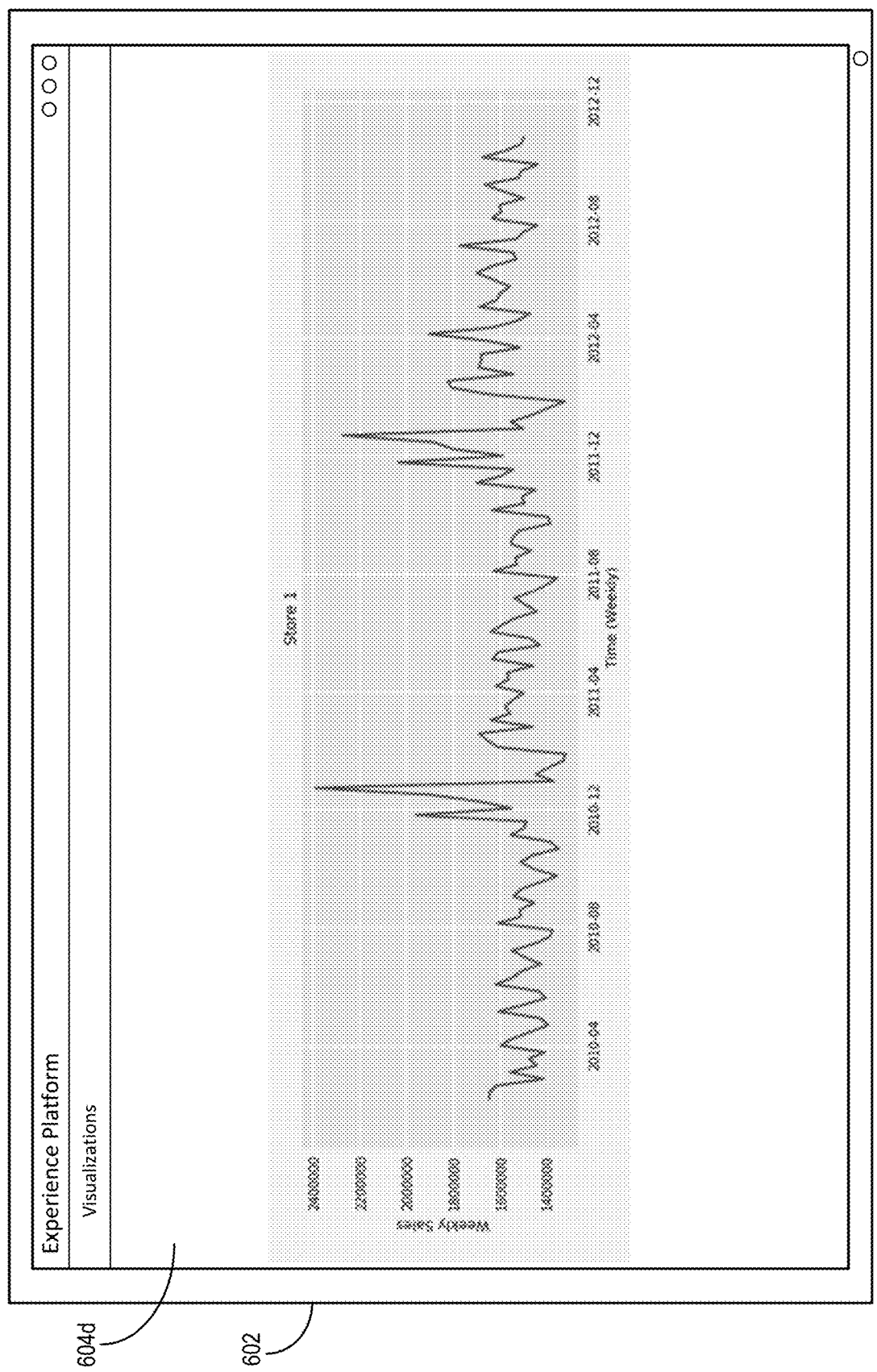

As further illustrated in FIG. 6C, the machine-learning visualization system 106 causes the computing device 602 to display the user interface 604c with a visualization comprising a box plot. In particular, FIG. 6C illustrates a box plot illustrating statistical distribution data regarding predicted sales volume across different stores. Moreover, as shown FIG. 6D illustrates predicted sales over time for a particular establishment. Thus, the machine-learning visualization system 106 can display predicted results of machine-learning models for a particular instance (e.g., a particular store) or across multiple instances (e.g., multiple stores) depending on custom parameters of the parameterized notebook. This information can be provided in addition to accuracy, efficiency, iterations, or other metrics regarding performance of a machine-learning model itself.

Figure 6E:
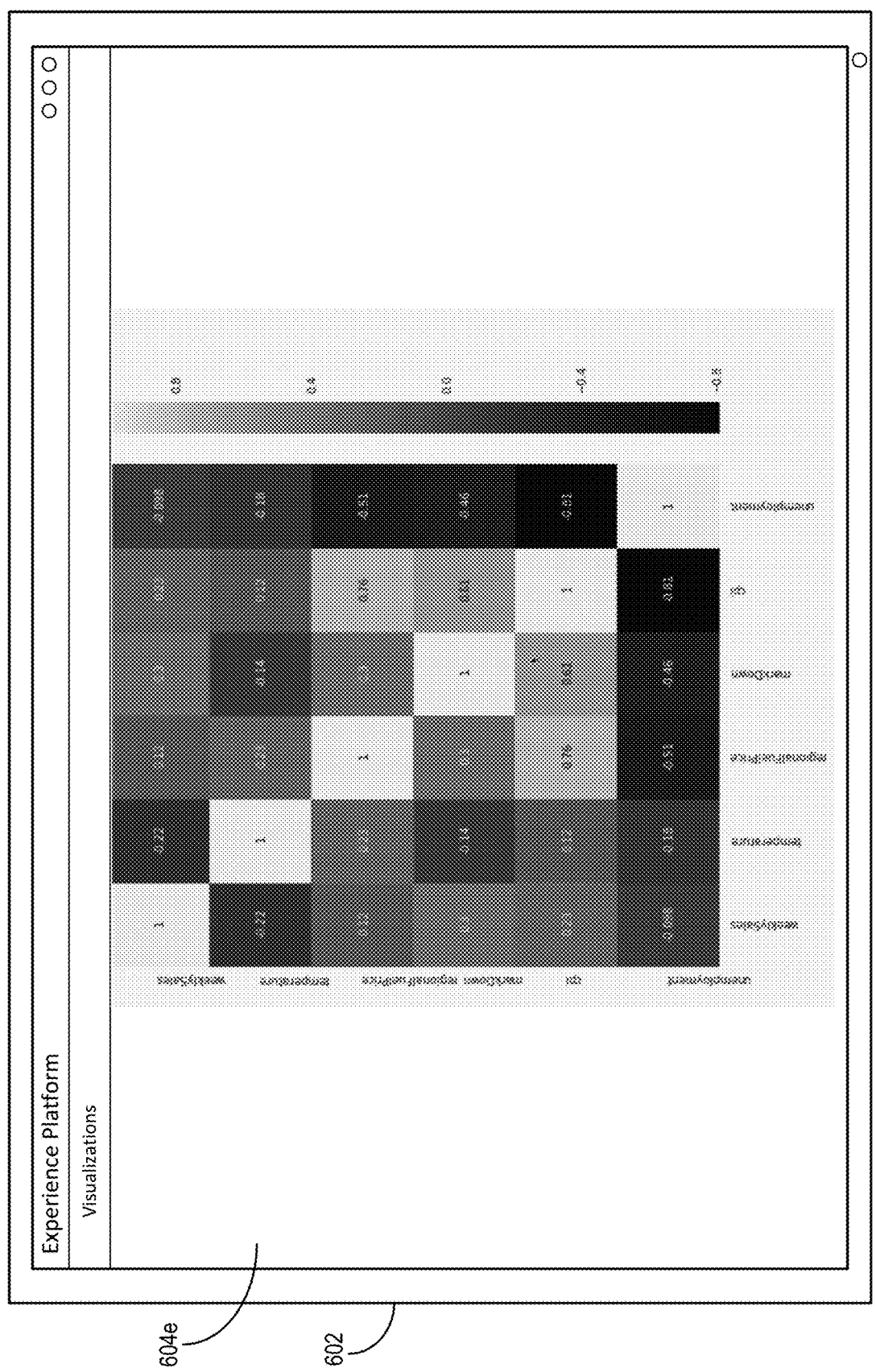

Furthermore, FIG. 6E illustrates the machine-learning visualization system 106 causing the computing device 602 to display the user interface 604e with a visualization comprising a confusion matrix. Again, the machine-learning visualization system 106 can generate and update such a non-standard visualization automatically based on a parameterized notebook. Moreover, the machine-learning visualization system 106 can provide this confusion matrix with respect to a different machine learning model than the other figures illustrated in FIGS. 6A-6D. Indeed, as described above, the machine-learning visualization system 106 can apply a parameterized notebook to parameter values from multiple machine learning models. Accordingly, the machine-learning visualization system 106 can generate non-standard visualizations that allow for comparison across machine learning models.

Figure 6F:
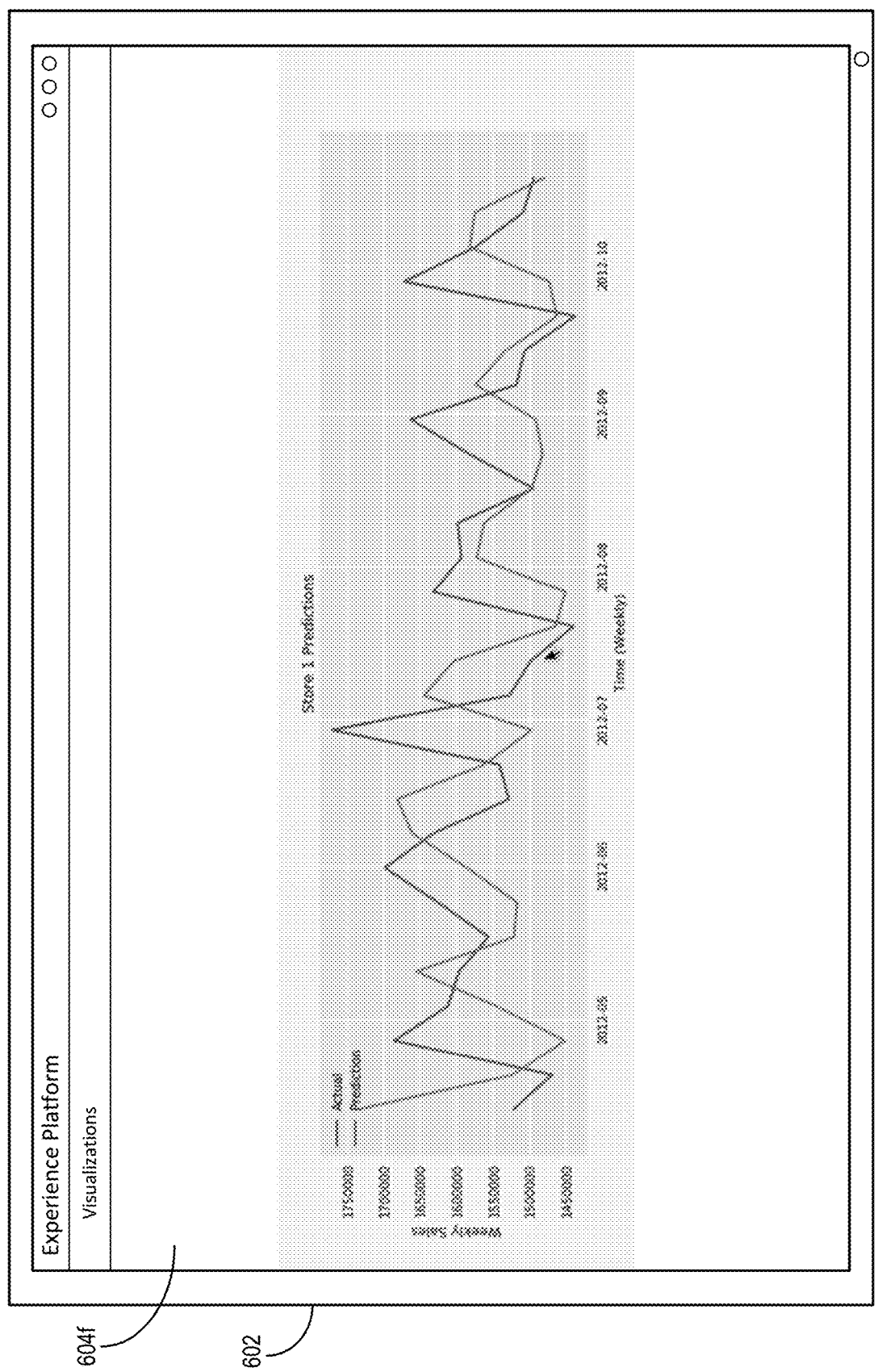

In addition, FIG. 6F illustrates the machine-learning visualization system 106 causing the computing device 602 to display the user interface 604f with a visualization comprising a line graph with a "prediction" line plot and an "actual" line plot (e.g., for comparison). In some embodiments, FIG. 6F illustrates yet another dynamic aspect of the machine-learning visualization system 106 via the visualization reflecting how a machine-learning model performs relative to measured values.

Although FIGS. 6A-6F illustrate a particular set of visualizations, the machine-learning visualization system 106 can generate different visualizations. Indeed, the machine-learning visualization system 106 can generate a wide variety of different visualizations based on custom recipes in parameterized notebooks.

Figure 7:
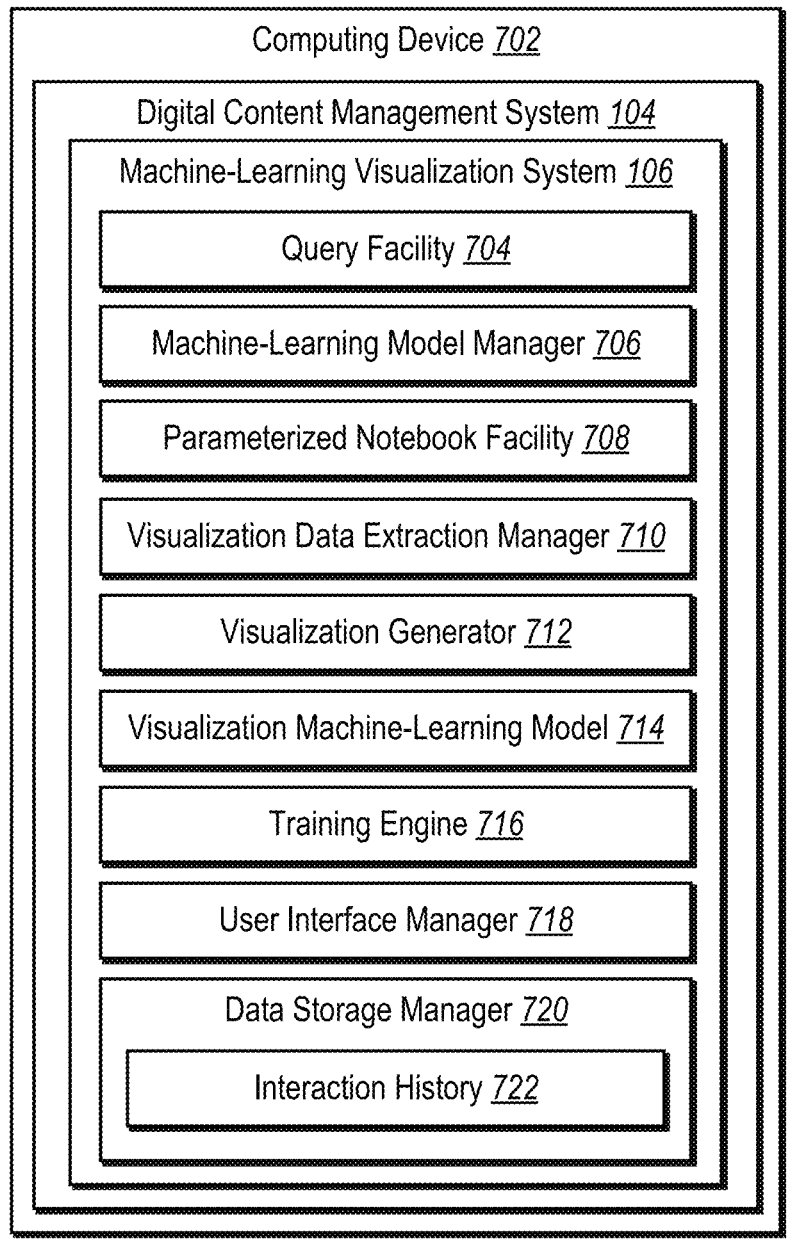
FIG. 7 illustrates an example schematic diagram of a machine-learning visualization system in accordance with one or more embodiments.

Turning to FIG. 7, additional detail will now be provided regarding various components and capabilities of the machine-learning visualization system 106. In particular, FIG. 7 illustrates an example schematic diagram of the machine-learning visualization system 106 implemented by a computing device 702 (e.g., the server(s) 102, the client device 108, the third-party server 118, and/or the administrator device 112) in accordance with one or more embodiments of the present disclosure. As shown, the machine-learning visualization system 106 is further implemented by the digital content management system 104. Also illustrated, the machine-learning visualization system 106 can include a query facility 704, a machine-learning model manager 706, a parameterized notebook facility 708, a visualization data extraction manager 710, a suggestion machine-learning model 714, training engine 716, a user interface manager 718, and a data storage manager 720.

The query facility 704 can obtain, send, receive, process, and/or analyze queries such as performance/status queries with respect to a machine-learning model. For example, the query facility 704 can receive a performance/status query from an administrator device (e.g., of a data scientist, software engineer, in-house manager/executive, etc.) that requests information regarding one or more execution runs of a machine-learning model. Similarly, the query facility 704 can receive a performance/status query from a client device (e.g., of an intelligent service user, customer, etc.) that requests information regarding how a machine-learning model is performing based on client data. In particular, the query facility 704 can sort and/or perform pre-processing of portions of a query. Additionally or alternatively, the query facility 704 can relay data from the query to the machine-learning model manager 706.

The machine-learning model manager 706 can execute, obtain, store, process, identify, and/or analyze a machine-learning model. For example, the machine-learning model manager 706 can execute a machine-learning model based on a scheduled job, a production task, a training/optimization execution run, a performance/status query, etc. as described above. In turn, the machine-learning model manager 706 can identify parameter values corresponding to the machine-learning model (e.g., based on executing the machine-learning model). Additionally or alternatively, the machine-learning model manager 706 can track execution runs for generating interaction history data with one or more machine-learning models and storage thereof (e.g., as interaction history 722).

The parameterized notebook facility 708 can generate, store, obtain, select, send, and/or receive a parameterized notebook based on a visualization recipe as described above. In particular, the parameterized notebook facility 708 can instruct execution of a parameterized notebook (e.g., by a third-party server such as the third-party server 118 of FIG. 1), while also enabling a variety of runtime languages for parameterized notebooks that may be the same as or different from a corresponding machine-learning model. Additionally, in some embodiments, the machine-learning model manager 706 can receive edits to a visualization recipe within a parameterized notebook and store parameterized notebooks (including associated edits thereto). For example, the machine-learning model manager 706 can create/manage a repository of parameterized notebooks (e.g., for user selection and/or recommendation by the suggestion machine-learning model 714).

The visualization data extraction manager 710 can identify, scrape, store, send, and/or receive visualization data corresponding to a machine-learning model from the parameterized notebook as described above. For example, upon execution of a visualization recipe, the visualization data extraction manager 710 can proceed to scrape visualization data as generated by the parameterized notebook. In turn, the visualization data extraction manager 710 can relay the visualization data to the visualization generator 712.

The visualization generator 712 can convert, render, format, and/or otherwise generate a visualization based on the visualization data from the visualization data extraction manager 710 as described above. For example, the visualization generator 712 can generate, from the visualization data in first format (e.g., a tabular format, a JavaScript format, a JavaScript object notation format, or a scalable vector graphics format), the visualization in a second format comprising at least one of a portable network graphics format or a hypertext markup language format. In turn, the visualization generator 712 can coordinate with the user interface manager 718 for displaying the visualization in a graphical user interface.

The suggestion machine-learning model 714 can generate suggestions as described above using at least one of a machine-learning model, a set of parameter values for a machine-learning model, or a visualization recipe. For example, the suggestion machine-learning model 714 can generate one or more suggestions that comprise a suggested visualization, a suggested visualization recipe, and/or a modification to a machine-learning model. Additionally or alternatively, the suggestion machine-learning model 714 can automatically implement a suggestion (e.g., without user input). For instance, based on an interaction history and a given machine-learning model, the suggestion machine-learning model 714 may recommend a particular visualization recipe.

The training engine 716 can train, teach, and/or learn machine-learning models, such as the suggestion machine-learning model 510 (e.g., based on an interaction history associated with machine-learning models, parameter values, and/or visualization recipes). For example, the training engine 716 can update parameters of the suggestion machine-learning model 510 according to loss data as described above in relation to FIG. 5B.

The user interface manager 718 can provide, manage, and/or control a graphical user interface (or simply "user interface"). In particular, the user interface manager 718 may generate and display a user interface by way of a display screen composed of a plurality of graphical components, objects, and/or elements that allow a user to perform a function. For example, the user interface manager 718 can receive user inputs from a user, such as a click/tap to provide a status/performance query regarding a machine-learning model. Additionally, the user interface manager 718 can present a variety of types of information, including text, digital media items, suggestions, machine-learning model performance, or other information.

The data storage manager 720 maintains data for the machine-learning visualization system 106. The data storage manager 720 (e.g., via one or more memory devices) can maintain data of any type, size, or kind, as necessary to perform the functions of the machine-learning visualization system 106, including the interaction history 722 for use by the suggestion machine-learning model 714 and/or the training engine 716 as described above. Additionally or alternatively, the data storage manager 720 can include one or more memory devices, for example, that include a machine-learning model and a user-defined visualization recipe (e.g., that the machine-learning visualization system 106 can utilize to perform various acts described above).

Each of the components of the computing device 702 can include software, hardware, or both. For example, the components of the computing device 702 can include one or more instructions stored on a computer-readable storage medium and executable by processors of one or more computing devices, such as a client device or server device. When executed by the one or more processors, the computer-executable instructions of the machine-learning visualization system 106 can cause the computing device(s) (e.g., the computing device 702) to perform the methods described herein. Alternatively, the components of the computing device 702 can include hardware, such as a special-purpose processing device to perform a certain function or group of functions. Alternatively, the components of the computing device 702 can include a combination of computer-executable instructions and hardware.

Furthermore, the components of the computing device 702 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 702 may be implemented as a stand-alone application, such as a desktop or mobile application. Furthermore, the components of the computing device 702 may be implemented as one or more web-based applications hosted on a remote server.

The components of the computing device 702 may also be implemented in a suite of mobile device applications or "apps." To illustrate, the components of the computing device 702 may be implemented in an application, including but not limited to ADOBE® CREATIVE CLOUD, ADOBE® PHOTOSHOP, ADOBE® MARKETING CLOUD, ADOBE® ANALYTICS, ADOBE® AUDIENCE MANAGER, ADOBE® EXPERIENCE MANAGER, ADOBE® CAMPAIGN, or ADOBE® TARGET. Product names, including "ADOBE" and any other portion of one or more of the foregoing product names, may include registered trademarks or trademarks of Adobe Systems Incorporated in the United States and/or other countries.

Figure 8:
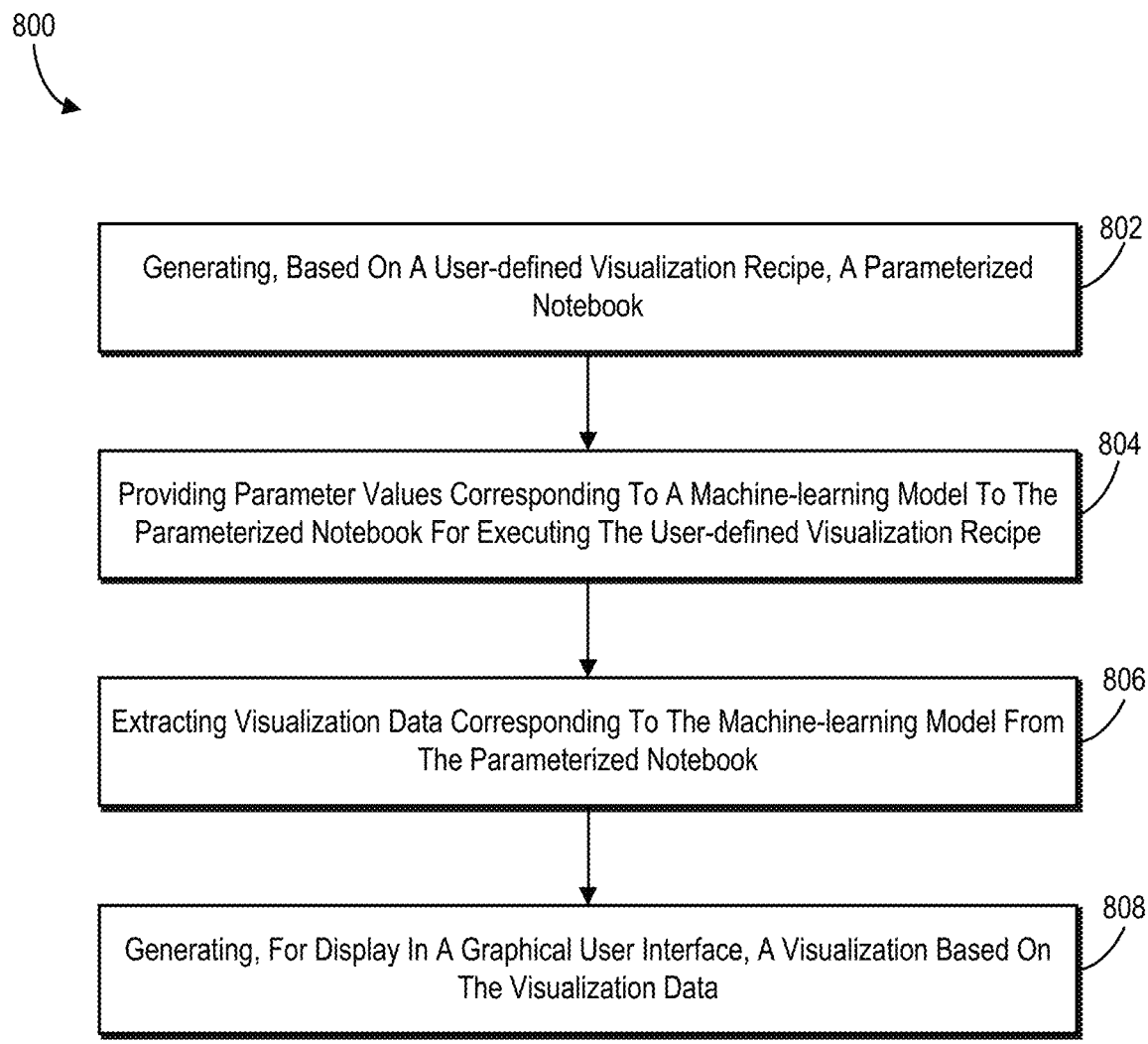
FIG. 8 illustrates a flowchart of a series of acts for generating a visualization regarding a machine-learning model in accordance with one or more embodiments.

FIGS. 1-7, the corresponding text, and the examples provide several different systems, methods, techniques, components, and/or devices of the machine-learning visualization system 106 in accordance with one or more embodiments. In addition to the above description, one or more embodiments can also be described in terms of flowcharts including acts for accomplishing a particular result. For example, FIG. 8 illustrates a flowchart of a series of acts 800 for utilizing a parameterized notebook to adaptively generate visualizations regarding a machine-learning model in accordance with one or more embodiments. The machine-learning visualization system 106 may perform one or more acts of the series of acts 800 in addition to or alternatively to one or more acts described in conjunction with other figures. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown, the series of acts 800 includes an act 802 of generating, based on a user-defined visualization recipe, a parameterized notebook. Further, the series of acts 800 includes an act 804 of providing a set of parameter values corresponding to a machine-learning model to the parameterized notebook for executing the user-defined visualization recipe. In some embodiments, the user-defined visualization recipe comprises computer-executable instructions in a first runtime language, and act 804 can further include providing the set of parameter values corresponding to the machine-learning model to the parameterized notebook by executing the machine-learning model comprising computer-executable instructions in a second runtime language different from the first runtime language.

The series of acts 800 further includes an act 806 of, upon execution of the user-defined visualization recipe via the parameterized notebook, extracting visualization data corresponding to the machine-learning model from the parameterized notebook. In addition, the series of acts 800 includes an act 808 of generating, for display in a graphical user interface, a visualization based on the visualization data.

It is understood that the outlined acts in the series of acts 800 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 8, an act in the series of acts 800 can include act(s) to re-execute the machine-learning model; generate a second set of parameter values corresponding to re-executing the machine-learning model; and provide the second set of parameter values to the parameterized notebook for re-executing the user-defined visualization recipe.

As another example act not shown in FIG. 8, an act in the series of acts 800 can include act(s) to: upon re-execution of the user-defined visualization recipe via the parameterized notebook, extract a second set of visualization data corresponding to re-executing the machine-learning model from the parameterized notebook; and generate, for display in the graphical user interface, a new visualization based on the second set of visualization data.

As yet another example act not shown in FIG. 8, an act in the series of acts 800 can include act(s) to generate the visualization by converting the visualization data in a first format to a second format. In these or other embodiments, the first format comprises at least one of a tabular format, a JavaScript format, a JavaScript object notation format, or a scalable vector graphics format. Additionally or alternatively, the second format can comprise at least one of a portable network graphics format or a hypertext markup language format.

As a further example act not shown in FIG. 8, an act in the series of acts 800 can include act(s) to detect, by tracking execution runs, an interaction history with one or more machine-learning models; and train a suggestion machine-learning model to generate suggestions based on the interaction history. Additionally or alternatively, an act in the series of acts 800 can include act(s) to apply the trained suggestion machine-learning model to at least one of the machine-learning model, the set of parameter values, or the user-defined visualization recipe to generate a suggestion comprising at least one of: a suggested visualization; a suggested visualization recipe; or a modification to the machine-learning model. In some embodiments, an act in the series of acts 800 can include act(s) to automatically implement the suggestion from the suggestion machine-learning model.

In still another example act not shown in FIG. 8, an act in the series of acts 800 can include act(s) to execute a second machine-learning model comprising computer-executable instructions in a second runtime language different from the first runtime language; generate a second set of parameter values corresponding to executing the second machine-learning model; and provide the second set of parameter values to the parameterized notebook for executing the user-defined visualization recipe in a third runtime language different from the first runtime language and the second runtime language.

In addition (or in the alternative) to the acts described above, in some embodiments, the series of acts 800 can include performing a step for utilizing a parameterized notebook comprising a user-defined visualization recipe to generate a visualization regarding the machine-learning model from the first set of parameter values. For instance, the acts and algorithms described above in relation to FIGS. 3 and 4 can comprise the corresponding acts (or structure) for a for utilizing a parameterized notebook comprising a user-defined visualization recipe to generate a visualization regarding the machine-learning model from the first set of parameter values.

Similarly, in some embodiments, the series of acts 800 can include performing a step for utilizing the parameterized notebook comprising the user-defined visualization recipe to generate a second visualization regarding the machine-learning model, the second visualization associated with the second set of parameter values from the machine-learning model different from the first set of parameter values. For instance, algorithms and acts described above in relation to FIGS. 3 and 4 can comprise the corresponding acts (or structure) for a step for utilizing the parameterized notebook comprising the user-defined visualization recipe to generate a second visualization regarding the machine-learning model, the second visualization associated with the second set of parameter values from the machine-learning model different from the first set of parameter values.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
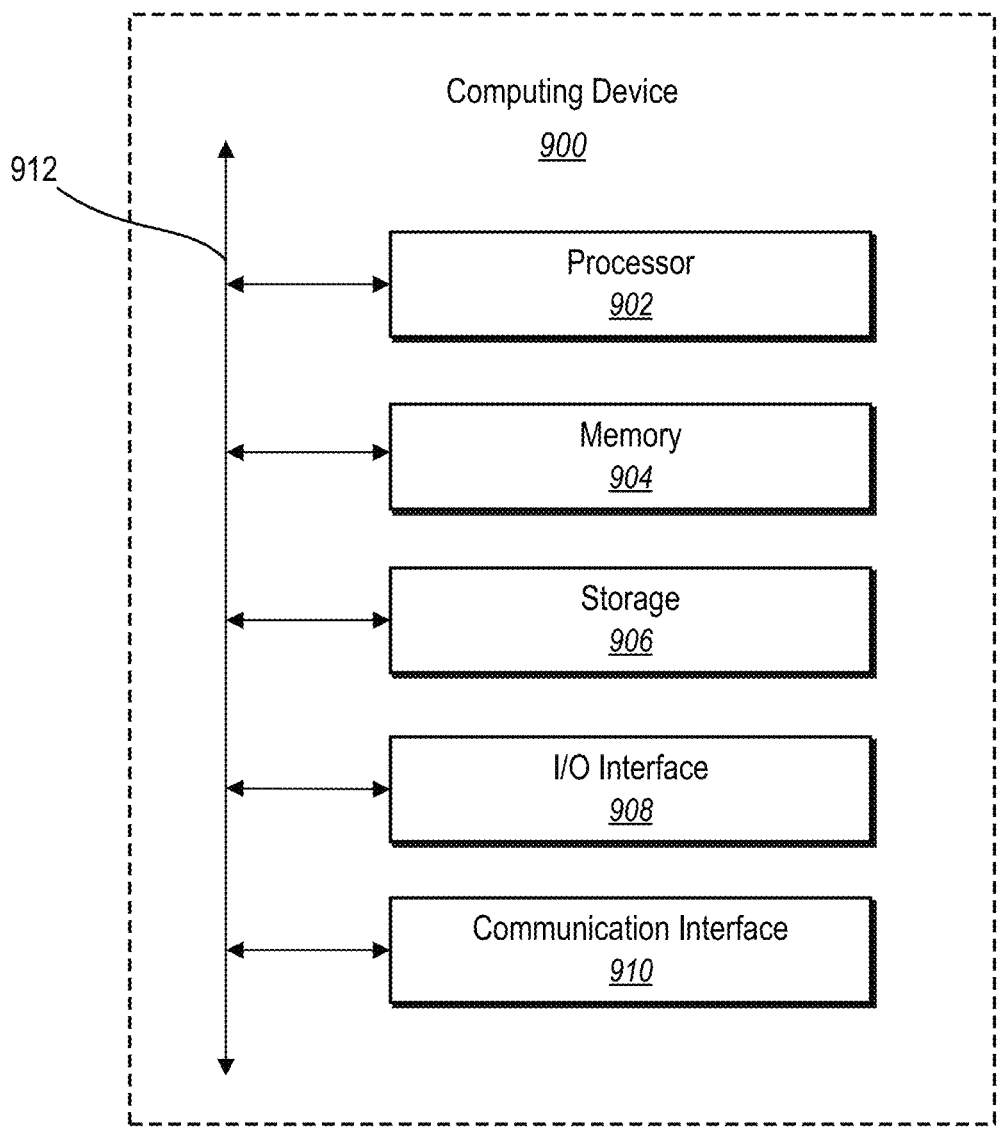
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., the computing device 702, the computing device 602, the server(s) 102, the administrator device 112, and/or the client device 108). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of the computing device 900 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, based on a user-defined visualization recipe, a headless parameterized notebook, wherein the user-defined visualization recipe comprises computer executable instructions in a first runtime language;
providing, to the headless parameterized notebook for executing the user-defined visualization recipe, a first set of parameter values from executing a machine-learning model comprising instructions in a second runtime language different from the first runtime language;
upon execution of the user-defined visualization recipe via the headless parameterized notebook, extracting visualization data corresponding to the machine-learning model from the headless parameterized notebook; and
generating, for display in a graphical user interface, a visualization based on the visualization data.

2. The computer-implemented method of claim 1, further comprising:
   detecting, by tracking execution runs, an interaction history with one or more machine-learning models; and
   training a suggestion machine-learning model to generate suggestions based on the interaction history.

3. The computer-implemented method of claim 2, further comprising:
   applying the trained suggestion machine-learning model to at least one of the machine-learning model, the first set of parameter values, or the user-defined visualization recipe to generate a suggestion comprising at least one of a suggested visualization, a suggested visualization recipe, or a modification to the machine-learning model.

4. The computer-implemented method of claim 1, wherein the visualization comprises at least one of a portable network graphics output or a hypertext markup language output.

5. A non-transitory computer-readable medium comprising instructions that, when executed by at least one processor, cause a computer system to perform operations comprising:
   generating, based on a user-defined visualization recipe, a headless parameterized notebook, wherein the user-defined visualization recipe comprises computer-executable instructions in a first runtime language;
   providing, to the headless parameterized notebook for executing the user-defined visualization recipe, a set of parameter values from executing a machine-learning model comprising instructions in a second runtime language different from the first runtime language;
   upon execution of the user-defined visualization recipe via the headless parameterized notebook, extracting visualization data corresponding to the machine-learning model from the headless parameterized notebook; and
   generating, for display in a graphical user interface, a visualization based on the visualization data.

6. The non-transitory computer-readable medium of claim 5, wherein providing the set of parameter values from executing the machine-learning model is based on identifying one or more of new parameter values, completion of an execution run, lapsing of a time period, or a request from a client device.

7. The non-transitory computer-readable medium of claim 5, further comprising instructions that, when executed by the at least one processor, cause the computer system to perform operations comprising:
   re-executing the machine-learning model;
   generating a second set of parameter values corresponding to re-executing the machine-learning model; and
   providing the second set of parameter values to the headless parameterized notebook for re-executing the user-defined visualization recipe.

8. The non-transitory computer-readable medium of claim 7, further comprising instructions that, when executed by the at least one processor, cause the computer system to perform operations comprising:
   upon re-execution of the user-defined visualization recipe via the headless parameterized notebook, extracting a second set of visualization data corresponding to re-executing the machine-learning model from the headless parameterized notebook; and
   generating, for display in the graphical user interface, a new visualization based on the second set of visualization data.

9. The non-transitory computer-readable medium of claim 5, further comprising instructions that, when executed by the at least one processor, cause the computer system to perform operations comprising:
   generating the visualization by converting the visualization data in a first format to a second format,
   wherein the first format comprises at least one of a tabular format, a JavaScript format, a JavaScript object notation format, or a scalable vector graphics format; and
   wherein the second format comprises at least one of a portable network graphics format or a hypertext markup language format.

10. The non-transitory computer-readable medium of claim 5, further comprising instructions that, when executed by the at least one processor, cause the computer system to perform operations comprising:
    detecting, by tracking execution runs, an interaction history with one or more machine-learning models; and
    training a suggestion machine-learning model to generate suggestions based on the interaction hi story.

11. The non-transitory computer-readable medium of claim 10, further comprising instructions that, when executed by the at least one processor, cause the computer system to perform operations comprising:
    applying the trained suggestion machine-learning model to at least one of the machine-learning model, the set of parameter values, or the user-defined visualization recipe to generate a suggestion comprising at least one of:
    a suggested visualization;
    a suggested visualization recipe; or
    a modification to the machine-learning model.

12. The non-transitory computer-readable medium of claim 11, further comprising instructions that, when executed by the at least one processor, cause the computer system to perform operations comprising automatically implementing the suggestion from the suggestion machine-learning model.

13. A system comprising:
    one or more memory devices comprising a machine-learning model and a user-defined visualization recipe; and
    one or more server devices that cause the system to:
    execute the machine-learning model to determine a set of parameter values corresponding to the machine-learning model, wherein the machine-learning model comprises computer-executable instructions in a first runtime language;
    generate, based on the user-defined visualization recipe, a headless parameterized notebook, wherein the user-defined visualization recipe comprises computer-executable instructions in a second runtime language different from the first runtime language;
    provide the set of parameter values to the headless parameterized notebook for applying the user-defined visualization recipe to the set of parameter values;
    upon execution of the user-defined visualization recipe via the headless parameterized notebook, extract visualization data corresponding to the machine-learning model from the headless parameterized notebook; and
    generate, for display in a graphical user interface, a visualization based on the visualization data.

14. The system of claim 13, wherein the one or more server devices further cause the system to:

execute a second machine-learning model comprising computer-executable instructions in a third runtime language different from the second runtime language;
generate a second set of parameter values corresponding to executing the second machine-learning model; and
provide the second set of parameter values to the headless parameterized notebook for executing the user-defined visualization recipe in the second runtime language.

15. The system of claim 13, wherein the one or more server devices further cause the system to:
re-execute the machine-learning model;
generate a second set of parameter values corresponding to re-executing the machine-learning model; and
provide the second set of parameter values to the headless parameterized notebook for re-executing the user-defined visualization recipe.

16. The system of claim 15, wherein the one or more server devices further cause the system to:
upon re-execution of the user-defined visualization recipe via the headless parameterized notebook, extract a second set of visualization data corresponding to re-executing the machine-learning model from the headless parameterized notebook; and
generate, for display in the graphical user interface, a new visualization based on the second set of visualization data.

17. The system of claim 13, wherein the one or more server devices further cause the system to:
generate the visualization by converting the visualization data in a first format to a second format,
wherein the first format comprises at least one of a JavaScript format, a JavaScript object notation format, or a scalable vector graphics format; and
wherein the second format comprises at least one of a portable network graphics format or a hypertext markup language format.

18. The system of claim 13, wherein the one or more server devices further cause the system to utilize a suggestion machine-learning model to:
detect, by tracking execution runs, an interaction history with one or more machine-learning models; and
train a suggestion machine-learning model to generate suggestions based on the interaction history.

19. The system of claim 18, wherein the one or more server devices further cause the system to apply the trained suggestion machine-learning model to at least one of the machine-learning model, the set of parameter values, or the user-defined visualization recipe to generate a suggestion comprising at least one of:
a suggested visualization;
a suggested visualization recipe; or
a modification to the machine-learning model.

20. The system of claim 19, wherein the one or more server devices further cause the system to automatically implement the suggestion from the suggestion machine-learning model.

* * * * *